US012743785B2

(12) United States Patent
Cao et al.

(10) Patent No.: US 12,743,785 B2
(45) Date of Patent: Sep. 22, 2026

(54) MARKER, EDGE DETECTION DEVICE, AND EDGE DETECTION METHOD

(71) Applicant: Panasonic Automotive Systems Co., Ltd., Kanagawa (JP)

(72) Inventors: Yunyun Cao, Tokyo (JP); Shuji Akamatsu, Kanagawa (JP); Hirohito Mukai, Tokyo (JP); Shunsuke Tsujioka, Nara (JP); Osamu Shibata, Hyogo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 275 days.

(21) Appl. No.: 18/612,676

(22) Filed: Mar. 21, 2024

(65) Prior Publication Data

US 2024/0331166 A1 Oct. 3, 2024

(30) Foreign Application Priority Data

Mar. 30, 2023 (JP) ................................ 2023-055374
Dec. 28, 2023 (JP) ................................ 2023-223571

(51) Int. Cl.
*G06K 9/00* (2022.01)
*G06T 7/12* (2017.01)
(Continued)

(52) U.S. Cl.
CPC .................. *G06T 7/13* (2017.01); *G06T 7/12* (2017.01); *G06T 7/80* (2017.01); *G06T 7/90* (2017.01);
(Continued)

(58) Field of Classification Search
CPC .... G06T 7/13; G06T 7/12; G06T 7/80; G06T 7/90; G06T 2207/30204;
(Continued)

(56) References Cited

U.S. PATENT DOCUMENTS 9,269,157 B2 * 2/2016 Saban ...................... G02B 5/08
10,502,627 B2 * 12/2019 Tanimura ................ G01J 3/524
(Continued)

FOREIGN PATENT DOCUMENTS

CN 111080716 A * 4/2020 ............... G06T 7/90
CN 112477438 A * 3/2021 ................ B41J 2/07
(Continued)

*Primary Examiner* — Shervin K Nakhjavan
(74) *Attorney, Agent, or Firm* — Greenblum & Bernstein, P.L.C.

(57) ABSTRACT

A marker includes N (N is an integer greater than or equal to 3) first areas that are arranged adjacent to one another in a predetermined direction. At each of N−1 first boundaries between the N first areas, an amount of change in a color property corresponding to positions in the predetermined direction is greater than or equal to a first threshold value, in each of the N first areas, the amount of change in the color property corresponding to positions in the predetermined direction is less than or equal to a second threshold value that is less than the first threshold value, and a pattern of change in the color property corresponding to positions in the predetermined direction is common among the N first areas.

15 Claims, 28 Drawing Sheets

(51) Int. Cl.
*G06T 7/13* (2017.01)
*G06T 7/80* (2017.01)
*G06T 7/90* (2017.01)

(52) U.S. Cl.
CPC ............... *G06T 2207/30204* (2013.01); *G06T 2207/30252* (2013.01)

(58) Field of Classification Search
CPC . G06T 2207/30252; G06T 2207/10024; G06T 2207/30208
See application file for complete search history.

(56) References Cited

U.S. PATENT DOCUMENTS

| | | | | |
|---|---|---|---|---|
| 10,891,756 B2* | 1/2021 | Oyaizu | ..................... | G06T 7/60 |
| 2018/0286089 A1* | 10/2018 | Lee | ......................... | G06T 11/60 |
| 2021/0124174 A1* | 4/2021 | Tokunaga | ............ | H04N 17/002 |
| 2023/0262339 A1* | 8/2023 | Berg | ...................... | H04N 23/71 |
| 2024/0354528 A1* | 10/2024 | Pendyala | ............. | G06V 30/424 |
| 2025/0254261 A1* | 8/2025 | Sakatani | ................. | G01J 3/462 |
| 2026/0038407 A1* | 2/2026 | Barber | ................. | G09G 3/2003 |

FOREIGN PATENT DOCUMENTS

| | | | | |
|---|---|---|---|---|
| JP | 2015-227787 | | 12/2015 | |
| JP | 2015231088 A | * | 12/2015 | ............. H04N 17/00 |
| KR | 20110051909 A | * | 5/2011 | ............... G06T 7/75 |
| WO | WO-2016031190 A1 | * | 3/2016 | ........... G06V 40/166 |
| WO | WO-2019188316 A1 | * | 10/2019 | ........... H04N 1/4078 |

* cited by examiner

FIG. 2

Start
S1
Obtain image
S2
Generate edge image
S3
Calculate boundaries of object in predetermined direction
S4
Calculate range of marker corresponding to boundaries of object
S5
Detect boundaries in marker in range calculated
S6
Associate positions of boundaries of object with positions of boundaries in marker
S7
Calculate size of object
End

FIG. 10
(a) First derivative value of grayscale around boundary Bo11
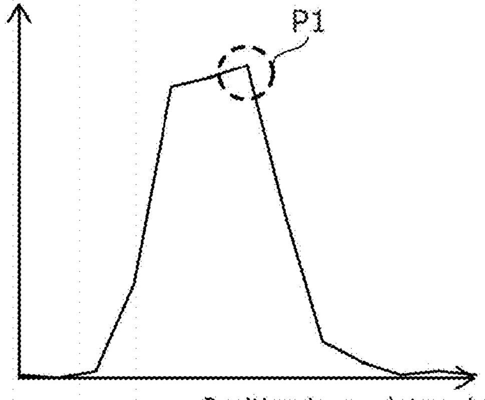
(b) First derivative value of grayscale around boundary Bo12
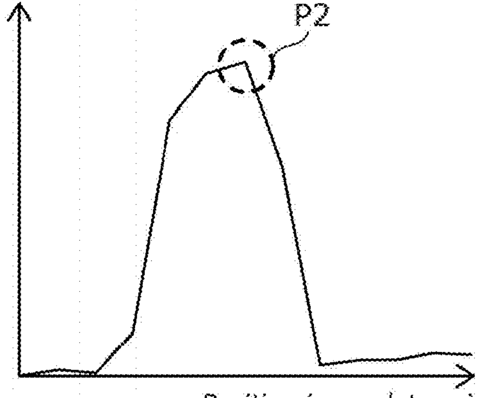
(c) First derivative value of grayscale around boundary Bo13
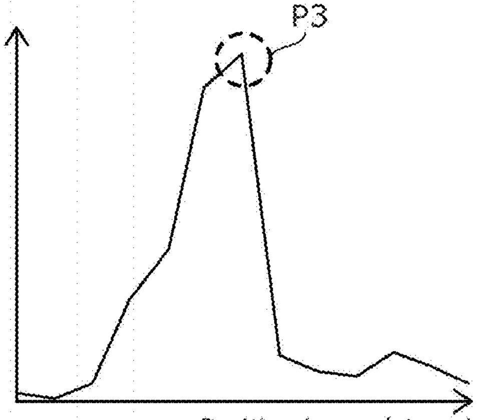

FIG. 14

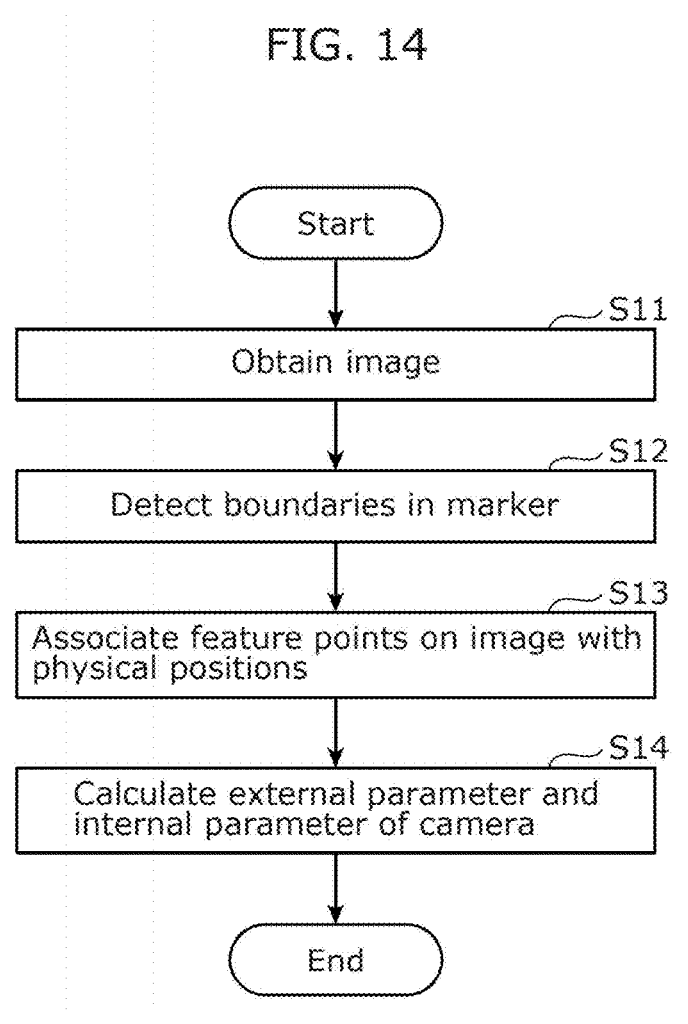

Start

S11 Obtain image

S12 Detect boundaries in marker

S13 Associate feature points on image with physical positions

S14 Calculate external parameter and internal parameter of camera

End

MARKER, EDGE DETECTION DEVICE, AND EDGE DETECTION METHOD

CROSS REFERENCE TO RELATED APPLICATIONS

The present application is based on and claims priority of Japanese Patent Application No. 2023-055374 filed on Mar. 30, 2023 and Japanese Patent Application No. 2023-223571 filed on Dec. 28, 2023.

FIELD

The present disclosure relates to a marker, an edge detection device, and an edge detection method.

BACKGROUND

Patent Literature (PTL) 1 discloses a method of calculating the actual size of an object by capturing an image of the object together with a marker including a long strip in which rectangles each having a predetermined length are arranged in a row and identifying the rectangles of the marker in the image obtained.

CITATION LIST

Patent Literature

PTL 1: Japanese Unexamined Patent Application Publication No. 2015-227787

SUMMARY

However, the method according to PTL 1 can be improved upon.

In view of this, the present disclosure provides a marker or the like capable of improving upon the above related art.

A marker according to an aspect of the present disclosure includes N (N is an integer greater than or equal to 3) first areas that are arranged adjacent to one another in a predetermined direction. In the marker, at each of N−1 first boundaries between the N first areas, an amount of change in a color property corresponding to positions in the predetermined direction is greater than or equal to a first threshold value, in each of the N first areas, the amount of change in the color property corresponding to positions in the predetermined direction is less than or equal to a second threshold value that is less than the first threshold value, and a pattern of change in the color property corresponding to positions in the predetermined direction is common among the N first areas.

Moreover, an edge detection device according to an aspect of the present disclosure detects an edge from an image of the marker captured by a camera. The edge detection device determines that an edge is present between two pixels adjacent to each other in the image when an amount of change in a color property between the two pixels is greater than or equal to the first threshold value, and determines that no edge is present between the two pixels when the amount of change in the color property between the two pixels is less than or equal to the second threshold value.

Furthermore, an edge detection method according to an aspect of the present disclosure is an edge detection method of detecting an edge from an image of the marker captured by a camera. The edge detection method includes determining that an edge is present between two pixels adjacent to each other in the image when an amount of change in a color property between the two pixels is greater than or equal to the first threshold value, and determining that no edge is present between the two pixels when the amount of change in the color property between the two pixels is less than or equal to the second threshold value.

It should be noted that a general or specific aspect of the present disclosure may be realized as a system, a method, integrated circuitry, a computer program, a non-transitory computer-readable recording medium such as a CD-ROM, or any given combination thereof.

A marker or the like according to an aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 2 illustrates an example of a configuration of a marker according to Embodiment 1.

FIG. 10 illustrates graphs each of which shows a first derivative value of grayscale corresponding to positions in the predetermined direction in an area around different one of 3 boundaries in the marker according to Embodiment 1.

FIG. 14 is a flowchart showing an example of operations performed by the information processing device according to Embodiment 2.

FIG. 19 illustrates an example of a configuration of a marker according to Variation 2 of Embodiment 2.

FIG. 20 illustrates an example of the configuration of the marker according to Variation 2 of Embodiment 2.

FIG. 23 illustrates another example of the configuration of the marker according to Variation 3 of Embodiment 2.

FIG. 24 illustrates another example of the configuration of the marker according to Variation 3 of Embodiment 2.

FIG. 25 illustrates an example of a configuration of a marker according to Variation 4 of Embodiment 2.

FIG. 29 illustrates an example of a configuration of a marker according to Variation 5 of Embodiment 2.

FIG. 30 illustrates an example of the configuration of the marker according to Variation 5 of Embodiment 2.

Figure 1:
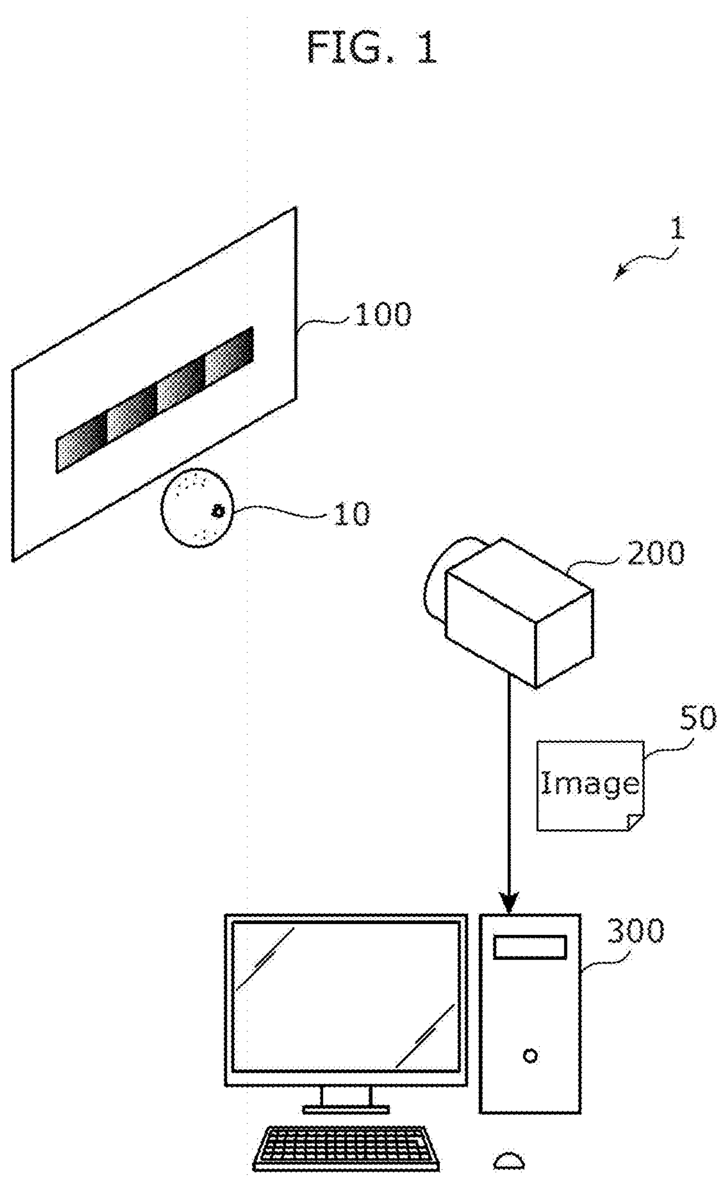
FIG. 1 illustrates an example of a schematic configuration of a measurement system according to Embodiment 1.

DESCRIPTION OF EMBODIMENTS (Underlying Knowledge Forming Basis of the Present Disclosure)

With the technique disclosed in PTL 1, the actual size of an object is calculated by identifying boundaries between a plurality of rectangle areas each having a predetermined length and comparing the boundaries identified with the external shape of the object.

However, with the technique disclosed in PTL 1, it is difficult to precisely identify the positions of the boundaries in the marker.

In view of this, the present disclosure provides a marker or the like including a plurality of areas in which the positions of boundaries between the plurality of areas may be precisely identified.

A marker according to a first aspect of the present disclosure includes N (N is an integer greater than or equal to 3) first areas that are arranged adjacent to one another in a predetermined direction. In the marker, at each of N−1 first boundaries between the N first areas, an amount of change in a color property corresponding to positions in the predetermined direction is greater than or equal to a first threshold value, in each of the N first areas, the amount of change in the color property corresponding to positions in the predetermined direction is less than or equal to a second threshold value that is less than the first threshold value, and a pattern of change in the color property corresponding to positions in the predetermined direction is common among the N first areas.

According to this aspect, in the marker, the amount of change in the color property corresponding to positions in the predetermined direction is greater than or equal to the first threshold value at each of the N−1 first boundaries between the N first areas, and the amount of change in the color property corresponding to positions in the predetermined direction is less than or equal to the second threshold value in each of the N first areas. Therefore, the N−1 first boundaries can be identified by detecting a position where the amount of change in the color property is greater than or equal to the first threshold value. Moreover, since the pattern of change in the color property corresponding to positions inside an area in the predetermined direction is common among the N first areas, a mode of change in the color property can also be made common among the N−1 first boundaries between the N first areas. Accordingly, when an image of the marker is captured by a camera, even if the image is affected by a chromatic aberration caused by an optical system of the camera, the positions of the N−1 first boundaries in the marker can be precisely identified since a mode of change in the color property in the image can be made common.

A marker according to a second aspect of the present disclosure is the marker according to the first aspect. In the second aspect, in each of the N first areas, the color property gradually increases or decreases from one end to an other end in the predetermined direction.

According to this aspect, it is possible to prevent erroneous detection of a first boundary in each of the N first areas.

A marker according to a third aspect of the present disclosure is the marker according to the first or second aspect. In the third aspect, at each of the N−1 first boundaries, two first areas are adjacent to each other with the first boundary at a position where the color property is highest in one of the two adjacent first areas and a position where the color property is lowest in an other of the two adjacent first areas, the two first areas being included in the N first areas.

In order to make the mode of change in the color property common among the N−1 first boundaries, an area in which the color property changes by the second threshold value or less corresponding to positions in the predetermined direction needs to be provided in each of the N first areas. Thus, since an area in which the color property changes by the second threshold value or less corresponding to positions in the predetermined direction is provided in each of the N first areas in the marker, the N−1 first boundaries can be easily identified by maximizing the amount of change in the color property at each of the N−1 first boundaries. Accordingly, the positions of the N−1 first boundaries can be precisely identified.

A marker according to a fourth aspect of the present disclosure is the marker according to any one of the first to third aspects. In the fourth aspect, the marker further includes: M (M is an integer greater than or equal to 3) second areas that are arranged in the predetermined direction; and a reference line, the reference line is disposed between the N first areas and the M second areas, and intersects with the optical axis of a camera, the marker is disposed at a position to be captured by the camera, the N first areas are arranged on one side in the predetermined direction with respect to a reference position where the reference line and the optical axis intersect each other, the M second areas are arranged on the opposite side in the predetermined direction with respect to the reference position in the marker, at each of M−1 second boundaries between the M second areas, the amount of change in the color property corresponding to positions in the predetermined direction is greater than or equal to the first threshold value, in each of the M second areas, the amount of change in the color property corresponding to positions in the predetermined direction is less than or equal to the second threshold value, the pattern of change in the color property corresponding to positions in the predetermined direction is common among the M second areas, and a first pattern of change in the color property in a direction away from the reference position in each of the N first areas and a second pattern of change in the color property in a direction away from the reference position in each of the M second areas are common to each other.

For an image of the marker captured by a camera, a chromatic aberration caused by an optical system of the camera shows that the appearance of the chromatic aberration on one side of the optical axis of the optical system in the direction perpendicular to the optical axis has a tendency opposite to that on the other side of the optical axis in the direction perpendicular to the optical axis. Accordingly, a mode of change in the color property can be made common between the N−1 first boundaries and the M−1 second boundaries in the image captured, by arranging the N first areas on one side with respect to the optical axis of the camera and the M second areas on the other side with respect to the optical axis. Accordingly, when an image of the marker is captured by a camera, even if the image is affected by a chromatic aberration caused by an optical system of the camera, a mode of change in the color property can be made common in the image. Thus, the positions of the N−1 first boundaries and the positions of the M−1 second boundaries in the marker can be precisely identified.

A marker according to a fifth aspect of the present disclosure is the marker according to the fourth aspect. In the fifth aspect, the marker further includes a plurality of third areas defined by circles having different diameters centered at the reference position, and each of the plurality of third areas includes one of the N first areas that corresponds to the third area and one of the M second areas that corresponds to the third area.

A marker according to a sixth aspect of the present disclosure is the marker according to the fourth or fifth aspect. In the sixth aspect, the color property is brightness, at each of the N−1 first boundaries, a position where the brightness is lowest in one of two first areas adjacent to each other across the first boundary and a position where the brightness is highest in an other of the two first areas are adjacent to each other in stated order in the direction away from the reference position, the two first areas being included in the N first areas, and at each of the M−1 second boundaries, a position where the brightness is lowest in one of two second areas adjacent to each other across the second boundary and a position where the brightness is highest in an other of the two second areas are adjacent to each other in stated order in the direction away from the reference position, the two second areas being included in the M second areas.

The number of peaks in the amount of change in the color property can be limited to one at each boundary formed by arranging the position where the brightness is lowest and the position where the brightness is highest adjacent to each other in the stated order in the direction away from the reference position. Thus, the positions of the N−1 first boundaries and the positions of the M−1 second boundaries can be precisely identified.

A marker according to a seventh aspect of the present disclosure is the marker according to the first aspect. In the seventh aspect, the marker is used for camera calibration for a vehicle-mounted camera.

A marker according to an eighth aspect of the present disclosure is the marker according to the seventh aspect. In the eighth aspect, the marker further includes: M (M is an integer greater than or equal to 3) second areas that are arranged in the predetermined direction; N first areas described above, and a passage area through which the vehicle passes, the passage area being disposed between the N first areas and the M second areas.

A marker according to a ninth aspect of the present disclosure is the marker according to the seventh or eighth aspect. In the ninth aspect, the camera captures an image of the front or the back of the vehicle, and the predetermined direction extends in a left-right direction of the vehicle.

A marker according to a tenth aspect of the present disclosure is the marker according to the seventh or eighth aspect. In the tenth aspect, the camera captures an image of the left or the right of the vehicle, and the predetermined direction extends in a front-back direction of the vehicle.

A marker according to an eleventh aspect of the present disclosure is the marker according to the ninth aspect. In the eleventh aspect, the marker is disposed along a floor surface on which the vehicle is disposed.

A marker according to a twelfth aspect of the present disclosure is the marker according to the ninth aspect. In the twelfth aspect, the marker stands on a floor surface on which the vehicle is disposed.

A marker according to a thirteenth aspect of the present disclosure is the marker according to the seventh or eighth aspect. In the thirteenth aspect, the camera captures an image of the front or the back of the vehicle, the predetermined direction extends in a front-back direction of the vehicle, and the marker stands on a floor surface on which the vehicle is disposed.

An edge detection device according to a fourteenth aspect of the present disclosure detects an edge from an image of the marker according to any one of the first to thirteenth aspects captured by a camera. The edge detection device determines that an edge is present between two pixels adjacent to each other in the image when an amount of change in a color property between the two pixels is greater than or equal to the first threshold value, and determines that no edge is present between the two pixels when the amount of change in the color property between the two pixels is less than or equal to the second threshold value.

Thus, the positions of the N−1 first boundaries in the marker can be precisely identified.

An edge detection method according to a fifteenth aspect of the present disclosure is an edge detection method of detecting an edge from an image of the marker according to any one of the first to thirteenth aspects captured by a camera. The edge detection method includes determining that an edge is present between two pixels adjacent to each other in the image when an amount of change in a color property between the two pixels is greater than or equal to the first threshold value, and determining that no edge is present between the two pixels when the amount of change in the color property between the two pixels is less than or equal to the second threshold value.

Thus, the positions of the N−1 first boundaries in the marker can be precisely identified.

It should be noted that each of the embodiments described below shows a general or specific example of the present disclosure. The numerical values, shapes, materials, constituent elements, the arrangement and connection of the constituent elements, steps, the processing order of the steps, etc. shown in the embodiments below are mere examples, and therefore do not limit the scope of the present disclosure. Moreover, among the constituent elements in the embodiments below, constituent elements not recited in any one of the independent claims are described as arbitrary constituent elements.

Furthermore, it should be noted that the respective figures are schematic diagrams and are not necessarily precise illustrations. Furthermore, like constituent elements share the same reference signs.

Hereinafter, embodiments are specifically described with reference to the Drawings.

Embodiment 1

(1-1. Configuration)

FIG. 1 illustrates an example of a schematic configuration of a measurement system according to Embodiment 1.

Measurement system 1 measures the size of the external shape of object 10 by using camera 200 to capture an image of object 10 to be measured together with marker 100 and using information processing device 300 to perform image processing on image 50 captured by camera 200. Object 10 is an orange in the present embodiment. Object 10 is not limited to an orange and may be anything that has a shape. Measurement system 1 includes marker 100, camera 200, and information processing device 300.

Marker 100 is disposed within an image-capturing range of camera 200 and faces camera 200. Marker 100 is disposed to face forward to camera 200, namely, disposed to be perpendicular to the optical axis of camera 200. Moreover, the distance between marker 100 and camera 200 is approximately the same as the distance between object 10 to be measured and camera 200. The configuration of marker 100 will be described later in detail with reference to FIG. 2.

Camera 200 captures an image of an image-capturing range including marker 100 and consequently generates image 50. As illustrated in FIG. 1, when object 10 is disposed within the image-capturing range including marker 100, camera 200 captures an image of marker 100 and object 10 to generate image 50 including marker 100 and object 10. Camera 200 includes an optical system including a lens (not illustrated) and an image sensor (not illustrated) that converts, into a digital signal, light converged by the optical system. The image sensor may be a color image sensor including a plurality of pixels each including subpixels each of which detects a different one of RGB colors, or a monochrome image sensor. In other words, camera 200 may be a color camera or a monochrome camera.

Information processing device 300 obtains, from camera 200, image 50 generated by camera 200, and performs predetermined image processing on image 50 to calculate the size of the external shape of object 10. It should be noted that if information processing device 300 can identify the external shape of a part of object 10 regardless of the external shape of object 10, information processing device 300 can calculate the size of the external shape of the part.

Figure 2:
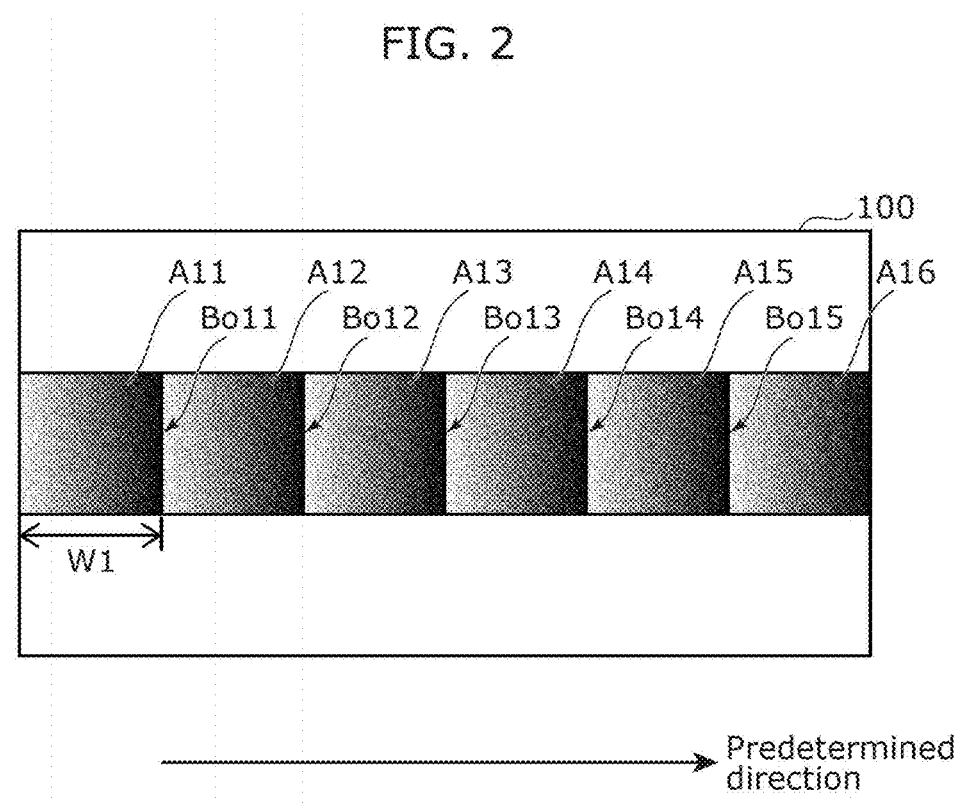

FIG. 2 illustrates an example of a configuration of a marker according to Embodiment 1.

Marker 100 includes six areas A11 to A16 that are arranged adjacent to one another in a predetermined direction (horizontal direction in this embodiment). Marker 100 includes a flat surface and six areas A11 to A16 on the flat surface. For example, marker 100 is a member (e.g., plate-like member) including a flat surface and areas A11 to A16 on the flat surface. It should be noted that the number of areas included in marker 100 is not limited to six and it is sufficient if marker 100 includes three or more, that is, N (N is an integer greater than or equal to 3) areas. Six areas A11 to A16 are an example of N first areas. Moreover, although the predetermined direction is a horizontal direction in the embodiment, the predetermined direction may be a longitudinal direction or another direction. Since marker 100 is disposed to face forward to camera 200, the predetermined direction may be any direction that intersects the optical axis of camera 200 when an image of marker 100 is captured by camera 200.

Each of six areas A11 to A16 has the same size in the predetermined direction. In other words, each of six areas A11 to A16 has the same width in the predetermined direction. The width in the predetermined direction is a predetermined width. In other words, the width of each of six areas A11 to A16 in the predetermined direction is determined in advance for marker 100, namely, is a known width. For example, information processing device 300 may store size information indicating the actual size of the width of each of six areas A11 to A16 of marker 100 in the predetermined direction.

Each of six areas A11 to A16 has a pattern of change in a color property corresponding to positions in the predetermined direction. The color property is brightness in the present embodiment. It should be noted that the color property may be at least one of brightness, grayscale, hue, or saturation.

The pattern of change in the color property corresponding to positions in the predetermined direction is common among six areas A11 to A16. Therefore, area A11 will be described below and description of other areas A12 to A16 will be omitted.

Area A11 has the pattern of change in the color property where the brightness decreases with a decrease in distance to area A12 that is adjacent to area A11 in the predetermined direction. In other words, area A11 has the pattern of change in the color property where the brightness becomes lower at a position more forward in the predetermined direction. Moreover, inside area A11, an amount of change in brightness corresponding to positions in the predetermined direction is less than or equal to a second threshold value that is less than a first threshold value. For example, in area A11, the brightness gradually decreases from one end to the other end in the predetermined direction. Moreover, in area A11, the brightness is highest at the negative-side end in the predetermined direction and lowest at the positive-side end in the predetermined direction.

Next, five boundaries Bo11 to Bo15 between six areas A11 to A16 are described. It should be noted that five boundaries Bo11 to Bo15 are an example of N−1 first boundaries.

An amount of change in a specific image quality property, which is color or brightness, corresponding to positions in the predetermined direction is greater than or equal to the first threshold value at each of five boundaries Bo11 to Bo15 between six areas A11 to A16. In each of six areas A11 to A16, the brightness is highest at the negative-side end in the predetermined direction and lowest at the positive-side end in the predetermined direction. Accordingly, at each of five boundaries Bo11 to Bo15, a position where the brightness is highest in one of two areas adjacent to each other across the boundary and a position where the brightness is lowest in the other of the two areas are adjacent to each other. In other words, at boundary Bo11, a position where the brightness is highest in area A12 and a position where the brightness is lowest in area A11 are adjacent to each other. Moreover, at boundary Bo12, a position where the brightness is highest in area A13 and a position where the brightness is lowest in area A12 are adjacent to each other. Furthermore, at boundary Bo13, a position where the brightness is highest in area A14 and a position where the brightness is lowest in area A13 are adjacent to each other. Furthermore, at boundary Bo14, a position where the brightness is highest in area A15 and a position where the brightness is lowest in area A14 are adjacent to each other. Furthermore, at boundary Bo15, a position where the brightness is highest in area A16 and a position where the brightness is lowest in area A15 are adjacent to each other.

Next, a configuration of information processing device 300 according to Embodiment 1 is described.

Figure 3:
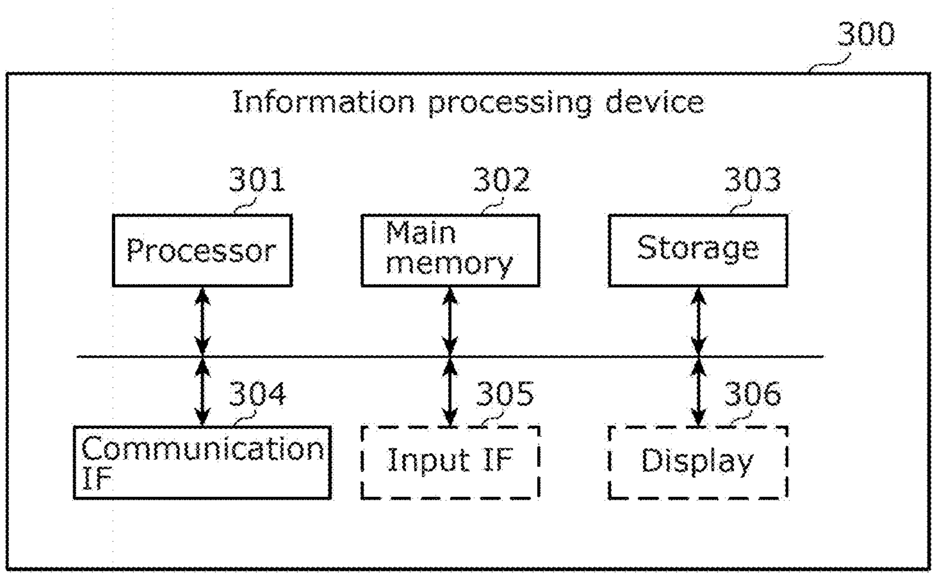
FIG. 3 is a block diagram illustrating an example of a configuration of an information processing device according to Embodiment 1.

FIG. 3 is a block diagram illustrating an example of a configuration of an information processing device according to Embodiment 1.

As illustrated in FIG. 3, information processing device 300 includes, as a hardware configuration, processor 301, main memory 302, storage 303, and communication interface (IF) 304. Information processing device 300 may further include input interface (IF) 305 and display 306. Information processing device 300 is an example of an edge detection device.

Processor 301 is a processor that executes a program stored in storage 303 or the like.

Main memory 302 is a volatile storage area that is used for temporarily storing data generated in a process performed by processor 301, used as a work area when processor 301 executes a program, or used for temporarily storing data received by communication IF 304.

Storage 303 is a non-volatile storage area that holds various data such as a program. For example, storage 303 stores various data including various data generated as a result of a process performed by processor 301, image 50 received by communication IF 304, and so on. Moreover, storage 303 may store feature information indicating a feature of marker 100. For example, the feature information may be size information indicating the width of each of six areas A11 to A16 included in marker 100 or information indicating the positions (coordinates) of five boundaries Bo11 to Bo15 defining six areas A11 to A16 in marker 100.

Communication IF 304 is a communication interface for receiving image 50 from camera 200. Moreover, communication IF 304 may be a communication interface for transferring data to/from an external device such as a smartphone, tablet, personal computer (PC), or server. For example, communication IF 304 may be an interface for wireless communication, such as a wireless LAN interface or Bluetooth (registered trademark) interface. Communication IF 304 may be an interface for wired communication, such as a universal serial bus (USB) or wired LAN interface.

Input IF 305 is an interface for receiving an input from a person. Input IF 305 may be a pointing device such as a mouse, touch pad, touch panel, or trackball, or a keyboard.

Display 306 is, for example, a liquid-crystal display or an organic EL display.

Figure 4:
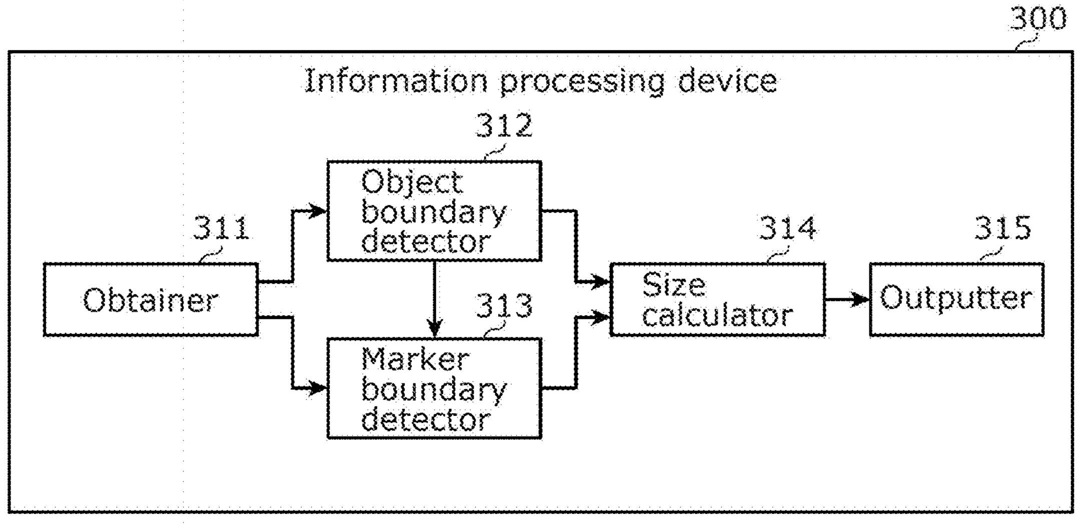
FIG. 4 is a block diagram illustrating an example of a functional configuration of the information processing device according to Embodiment 1.

FIG. 4 is a block diagram illustrating an example of a functional configuration of the information processing device according to Embodiment 1.

As illustrated in FIG. 4, information processing device 300 functionally includes obtainer 311, object boundary detector 312, marker boundary detector 313, size calculator 314, and outputter 315.

Obtainer 311 obtains image 50 from camera 200. For example, obtainer 311 is realized by communication IF 304 or the like.

Figure 5:
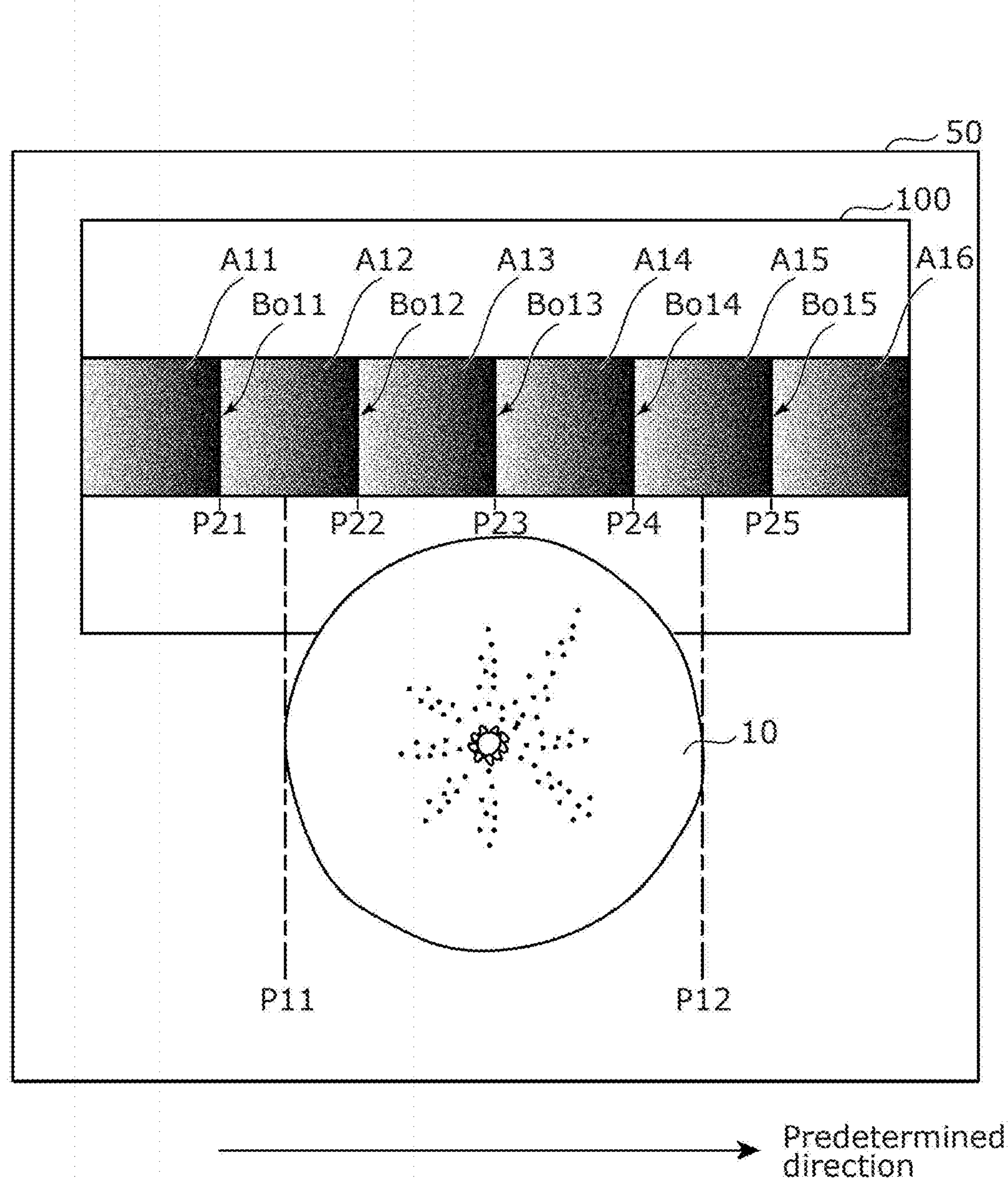
FIG. 5 illustrates an example of an image showing an object and the marker according to Embodiment 1.

FIG. 5 illustrates an example of an image showing an object and the marker according to Embodiment 1.

Object boundary detector 312 generates edge image 51 in which edges are emphasized by applying, to image 50, edge detection processing using a predetermined algorithm.

Figure 6:
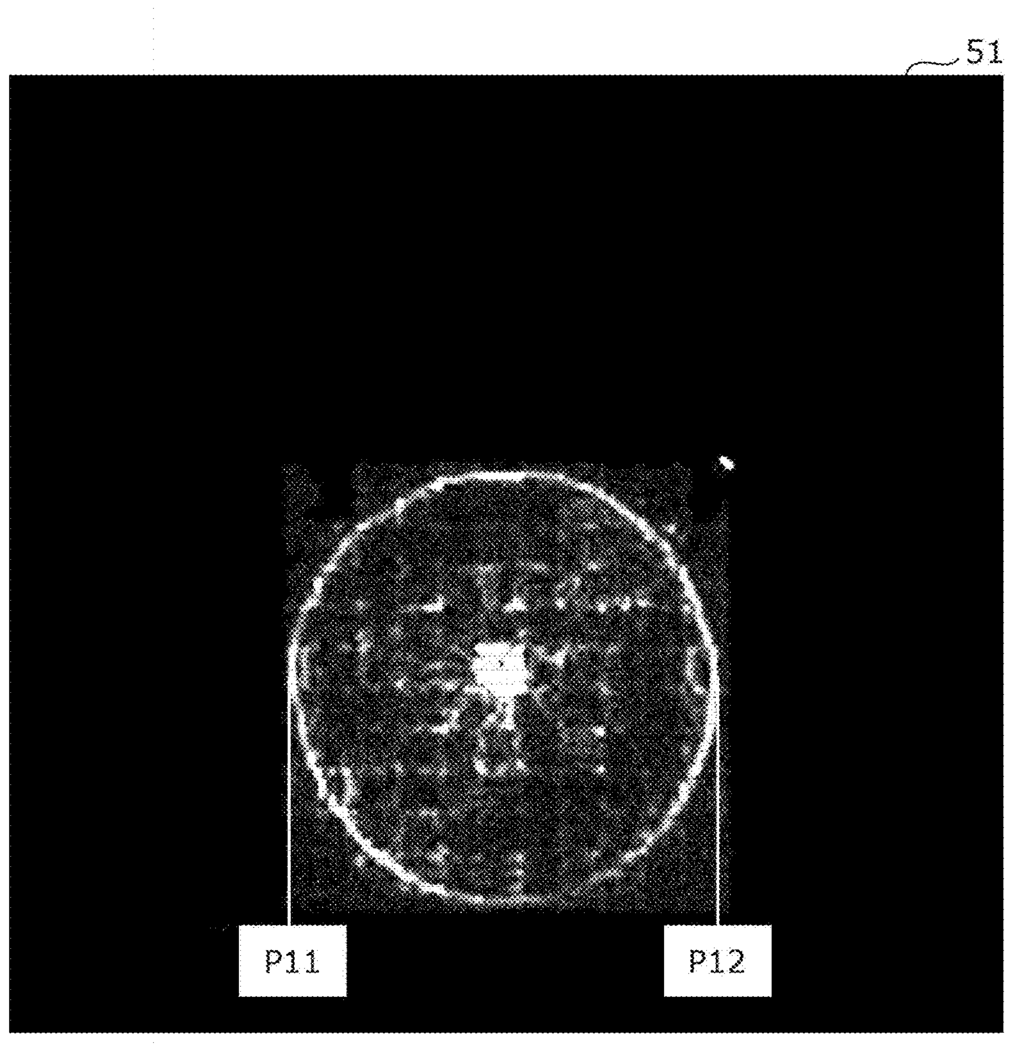
FIG. 6 illustrates an example of an edge image according to Embodiment 1.

FIG. 6 illustrates an example of an edge image according to Embodiment 1. It should be noted that the areas in the marker are omitted and edges of the marker are not shown in FIG. 6.

For example, edge image 51 is an image including, as a pixel value, an amount of change in grayscale. Edge image 51 is an image indicating that a pixel having a pixel value greater than a predetermined threshold value represents an edge. It should be noted that edge image 51 has a pixel array having the same number of pixels as the pixel array of image 50 has. Specifically, image 50 and edge image 51 each have the same number of pixels in a vertical direction and the same number of pixels in a horizontal direction.

Object boundary detector 312 identifies, as object boundaries of object 10 in the predetermined direction, a pixel having the smallest coordinates in the predetermined direction (horizontal direction in this embodiment) and a pixel having the largest coordinates in the predetermined direction, among pixels each having an amount of change in grayscale greater than the predetermined threshold value in edge image 51. In other words, when a negative-side end part of edge image 51 in the predetermined direction is regarded as an origin, object boundary detector 312 identifies a pixel closest to the origin and a pixel farthest from the origin in the predetermined direction, among pixels each having a pixel value greater than the predetermined threshold value. Thus, the pixel at minimum position P11 and the pixel at maximum position P12 of object 10 in the predetermined direction in image 50 are identified. It should be noted that minimum position P11 in the predetermined direction indicates the position of a negative-side end part of object 10 in the predetermined direction, and maximum position P12 in the predetermined direction indicates the position of a positive-side end part of object 10 in the predetermined direction. The object boundaries include minimum position P11 and maximum position P12 of object 10 in the predetermined direction.

It should be noted that object boundary detector 312 may perform the above-described process on only an area including object 10 in edge image 51. In this case, the area including object 10 in edge image 51 may be designated by a user or set in advance. When the area including object 10 in edge image 51 is set in advance, object 10 needs to be disposed so that object 10 is included in the area set in advance when camera 200 captures an image of object 10.

Marker boundary detector 313 identifies an area including marker 100 in image 50. The area including marker 100 in image 50 may be designated by a user or set in advance. When the area including marker 100 in image 50 is set in advance, the positional relationship between marker 100 and camera 200 needs to be determined so that marker 100 is included in the area set in advance when camera 200 captures an image of marker 100.

Then, marker boundary detector 313 calculates the range of marker 100 corresponding to the object boundaries identified by object boundary detector 312, within the area including marker 100 identified. Specifically, marker boundary detector 313 calculates, as the range of marker 100, the range from minimum position P11 to maximum position P12 of object 10 in the predetermined direction.

Within the obtained search range of marker 100, marker boundary detector 313 detects (searches for) boundaries in marker 100 in image 50. The search range may be the range from a position at which a boundary that is outside the range from minimum position P11 to maximum position P12 and closest to minimum position P11 is detected to a position at which a boundary that is outside the range from minimum position P11 to maximum position P12 and closest to maximum position P12 is detected, among the boundaries in marker 100. In other words, boundaries Bo12 to Bo14 within the range from minimum position P11 to maximum position P12 and boundaries Bo11 and Bo15 that are outside and closest to respective ends of the range are detected by the search.

It should be noted that, for example, marker boundary detector 313 calculates, by first derivative, grayscale change in the predetermined direction in the range of marker 100 corresponding to the boundaries in the predetermined direction in the area including marker 100 in image 50. The first derivative value is calculated by, for example, Equation 1 or Equation 2.

$$f'(x0)=|f(x0+1)-f(x0)| \quad \text{(Equation 1)}$$

$$f'(x0)=|f(x0+1)-f(x0-1)| \quad \text{(Equation 2)}$$

In Equation 1 and Equation 2, x0 represents a position in the predetermined direction. f(x0) represents the grayscale of a pixel at position x0. For example, grayscale is calculated based on the pixel values of subpixels of RGB when image 50 is a color image, and grayscale is a pixel value when image 50 is a monochrome image.

Then, marker boundary detector 313 may detect, as boundaries in marker 100, the positions of peaks in a first derivative graph of grayscale corresponding to positions in the predetermined direction. It should be noted that marker boundary detector 313 may determine whether the first derivative value of grayscale at the position of a peak is not less than the first threshold value. When the first derivative value of grayscale at the position of a peak is greater than or equal to the first threshold value, marker boundary detector 313 detects the position of the peak as a boundary in marker 100, and when the first derivative value of grayscale at the position of a peak is less than the first threshold value, marker boundary detector 313 does not detect the position of the peak as a boundary in marker 100.

Moreover, marker boundary detector 313 may detect, as a boundary in marker 100, the position of a centroid calculated by using a window having, as its center, the position of a peak in the first derivative graph of grayscale. The size of the window is determined in advance. For example, the position of a centroid is calculated by Equation 3 below.

[Math. 1]

$$x_g=\frac{\sum_{x=x_0-w-1}^{x_0+w}(x*f'(x))}{\sum_{x=x_0-w-1}^{x_0+w}f'(x)} \quad \text{(Equation 3)}$$

Here, $x_0$ represents a reference position of a window in the predetermined direction (position to be calculated), w represents the half width of the window, and x represents a position in the predetermined direction.

Thus, positions P21 to P25 of boundaries Bo11 to Bo15 in the predetermined direction are identified.

Size calculator 314 identifies, among boundaries Bo11 to Bo15, position P21 of boundary Bo11 that is closest to minimum position P11 that is one of the object boundaries, and calculates a first pixel number that is the number of pixels between minimum position P11 and position P21 in the predetermined direction. Here, boundary Bo11 is a boundary located outside (left side in FIG. 5) from minimum position P11 with respect to object 10. In other words, boundary Bo11 is a boundary closest to minimum position P11, among one or more boundaries each having coordinates smaller than the coordinates of minimum position P11. Moreover, size calculator 314 calculates a second pixel number that is the number of pixels between position P21 and position P22. Since width W of area A12 is already known, in the predetermined direction, length L per pixel in area A12 can be calculated by dividing width W by the second pixel number. Accordingly, the length from position P21 to position P11 can be calculated by multiplying length L by the first pixel number, and the length from position P11 to position P22 can be calculated by subtracting, from width W, the length from position P21 to position P11 calculated.

Similarly, the length from position P24 to position P12 can be calculated by calculating the length from maximum position P12 to position P25 of boundary Bo15 that is closest to maximum position P12. Here, boundary Bo15 is a boundary located outside (right side in FIG. 5) from maximum position P12 with respect to object 10. In other words, boundary Bo15 is a boundary closest to maximum position P12, among one or more boundaries each having coordinates greater than the coordinates of maximum position P12.

Then, the length from position P22 to position P24 can be calculated by multiplying width W by 2 since the length from position P22 to position P24 is the length of two areas, and the length from position P11 to position P12 can be calculated by adding up the length from position P11 to position P22, the length from position P22 to position P24, and the length from position P24 to position P12.

Thus, size calculator 314 can calculate, as the size of object 10 in the predetermined direction, the length from position P11 to position P12.

It should be noted that each of object boundary detector 312, marker boundary detector 313, and size calculator 314 is realized by processor 301, main memory 302, storage 303, etc., for example.

Outputter 315 outputs the size calculated by size calculator 314. Outputter 315 may transmit information indicating the size to an external device or display the size on display 306. Outputter 315 may be realized as communication IF 304 or display 306.

(1-2. Operation)

Figure 7:
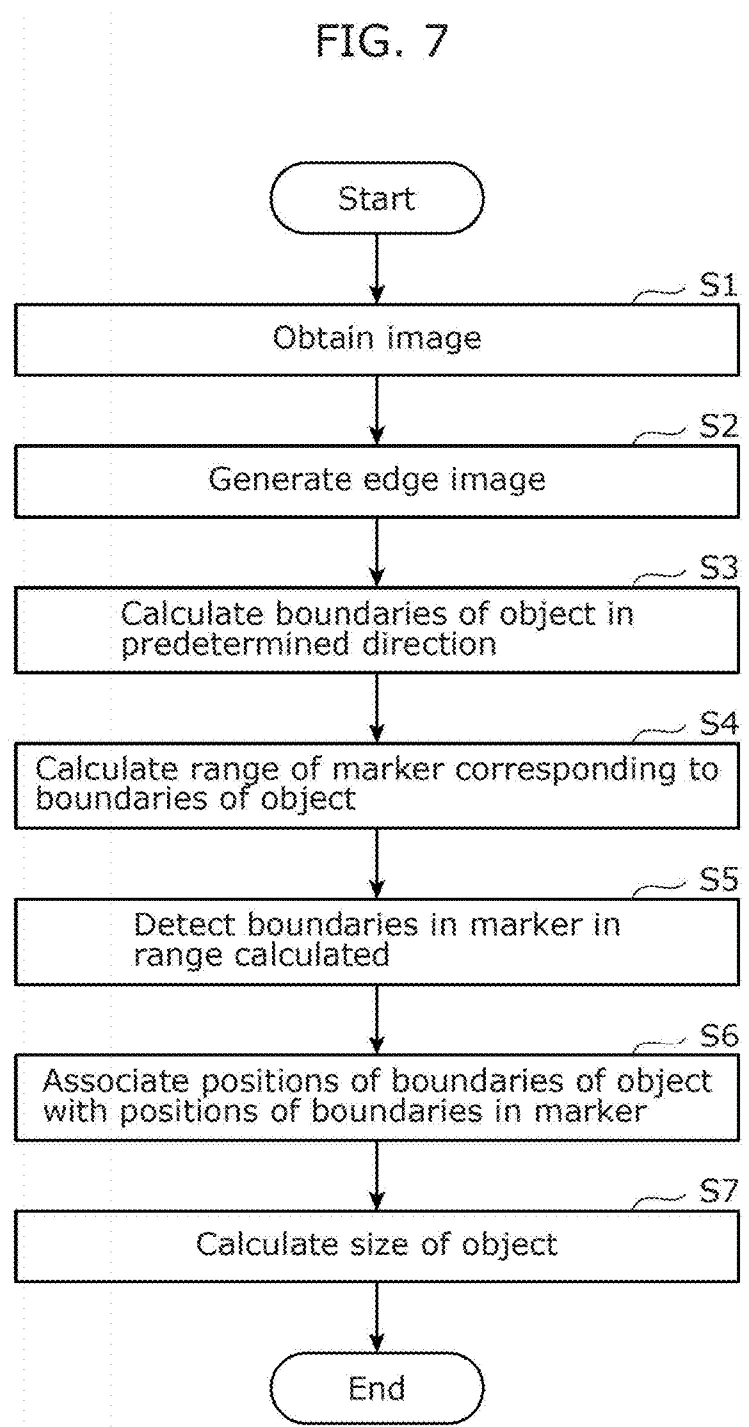
FIG. 7 is a flowchart showing an example of operations performed by the information processing device according to Embodiment 1.

FIG. 7 is a flowchart showing an example of operations performed by the information processing device according to Embodiment 1.

Information processing device 300 obtains image 50 from camera 200 (S1). The process in step S1 is a process performed by obtainer 311.

Next, information processing device 300 generates edge image 51 by applying edge detection processing to image 50 (S2). The process in step S2 is a process performed by object boundary detector 312.

Next, information processing device 300 calculates boundaries of object 10 in the predetermined direction in edge image 51 (S3). The process in step S3 is a process performed by object boundary detector 312.

Next, information processing device 300 calculates the range of marker 100 corresponding to the boundaries of object 10 in image 50 (S4). The process in step S4 is a process performed by marker boundary detector 313.

Next, information processing device 300 detects boundaries Bo11 to Bo15 in marker 100 in the range calculated in step S4 (S5).

Next, information processing device 300 associates positions P11 and P12 of the boundaries of object 10 with positions P21 to P25 of boundaries Bo11 to Bo15 in marker 100 (S6).

Next, information processing device 300 calculates the size of object 10 based on positions P11, P12, and P21 to P25 and width W of each of the areas that is already known (S7).

(1-3. Advantageous Effects, Etc.)

Here, the advantageous effect of marker 100 according to the present embodiment is described together with the conventional technique.

Figure 8:
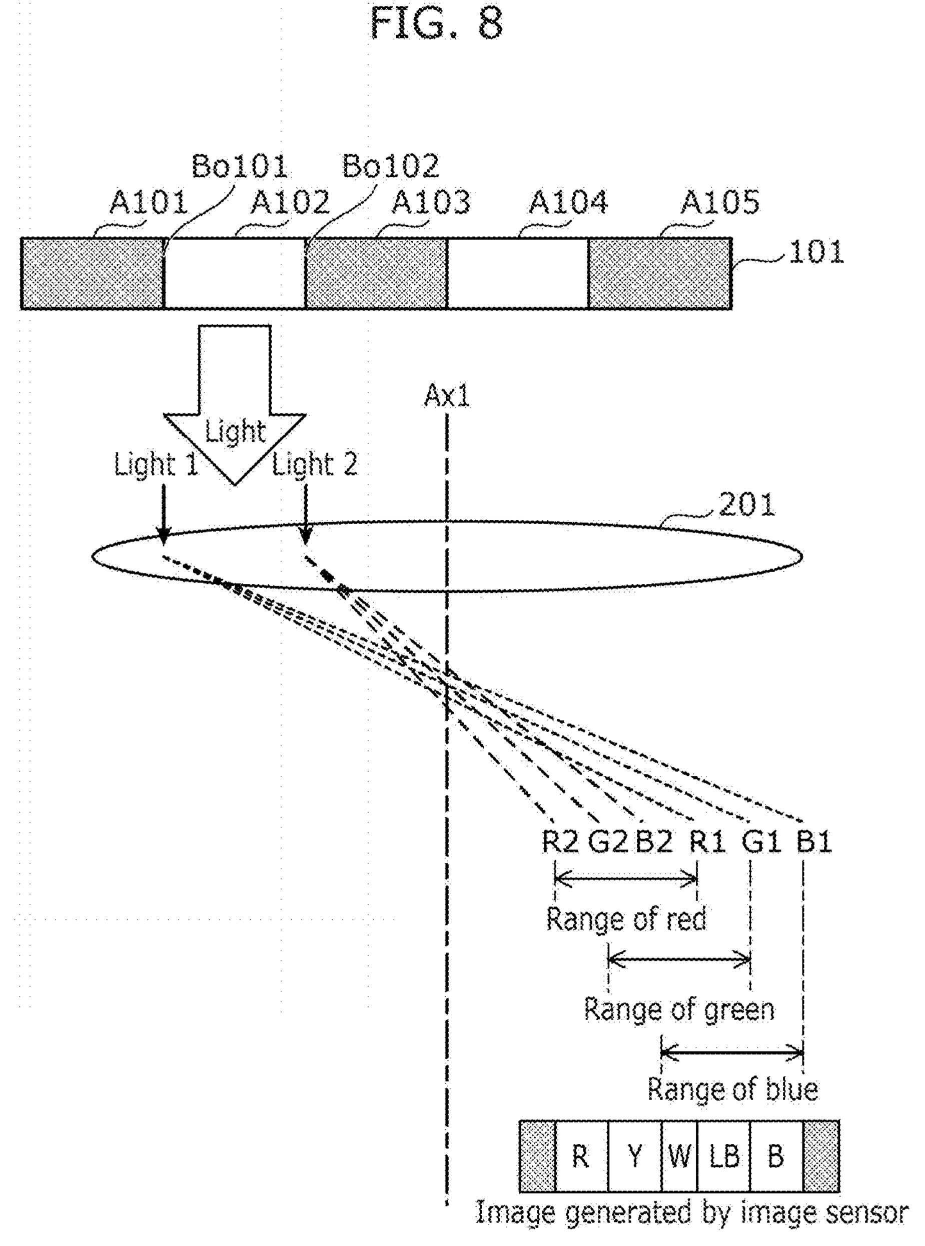
FIG. 8 is a diagram for describing a marker according to a comparative example.

FIG. 8 is a diagram for describing a marker according to a comparative example.

Marker 101 according to the comparative example includes a combination of two color areas that are black areas A101, A103, and A105 and white areas A102 and A104 arranged alternately adjacent to each other in a predetermined direction. It is assumed that there is a predetermined amount or more of difference between the brightness of each of black areas A101, A103, and A105 and the brightness of each of white areas A102 and A104.

In marker 101, for example, white area A102 is adjacent to two black areas A101 and A103. Therefore, an amount of change in brightness in the predetermined direction is greater than or equal to the first threshold value at each of the boundary between white area A102 and black area A101 that is adjacent to white area A102 and the boundary between white area A102 and black area A103 that is adjacent to white area A102, and the positions of the boundaries can be detected by analyzing an image of marker 101 captured.

When an image of marker 101 is captured, in camera 200 that captures the image of marker 101, light is focused by an optical system such as lens 201 of camera 200 and received by an image sensor. The white light from white area A102 is light having a mixed color of three primary colors, that is, red, green, and blue, and since the refractive indices of red, green, and blue lights are different from each other depending on the wavelengths when passing through lens 201, the range of red light, the range of green light, and the range of blue light are different from each other in position after passing through lens 201, as illustrated in FIG. 8. Therefore, for example, white light 1 from a position close to boundary Bo101 in area A102 is broken up into red component light R1, green component light G1, and blue component light B1. Similarly, for example, white light 2 from a position close to boundary Bo102 in area A102 is broken up into red component light R2, green component light G2, and blue component light B2. Light 1 and light 2 are lights from both ends of white area A102 in the predetermined direction, and since there is almost no light from black areas A101 and A103 that are adjacent to white area A102, in the image sensor, pixels at one end of pixels detected as white area A102 receive red component light and yellow component light and pixels at the other end of the pixels detected as white area A102 receive light-blue component light and blue component light. Thus, when light from white area A102 is received by the image sensor, since one end of a pixel area detected as white includes a red component area and a yellow component area and the other end of the pixel area detected as white includes a light-blue component area and a blue component area, the image generated by the image sensor also includes a red component area (represented by "R" in FIG. 8), a yellow component area (represented by "Y" in FIG. 8), a white component area (represented by "W" in FIG. 8), a light-blue component area (represented by "LB" in FIG. 8), and a blue component area (represented by "B" in FIG. 8) in the stated order. Therefore, in the image generated by camera 200, an area around boundary Bo101 in marker 101 and an area around boundary Bo102 in marker 101 are different in pattern of change in a color property. It should be noted that red component light and yellow component light each having a long wavelength are refracted toward a position close to optical axis Ax1 of camera 200 with respect to the white component area, and light-blue component light and blue component light each having a short wavelength are refracted toward a position far from optical axis Ax1 with respect to the white component area.

Figure 9:
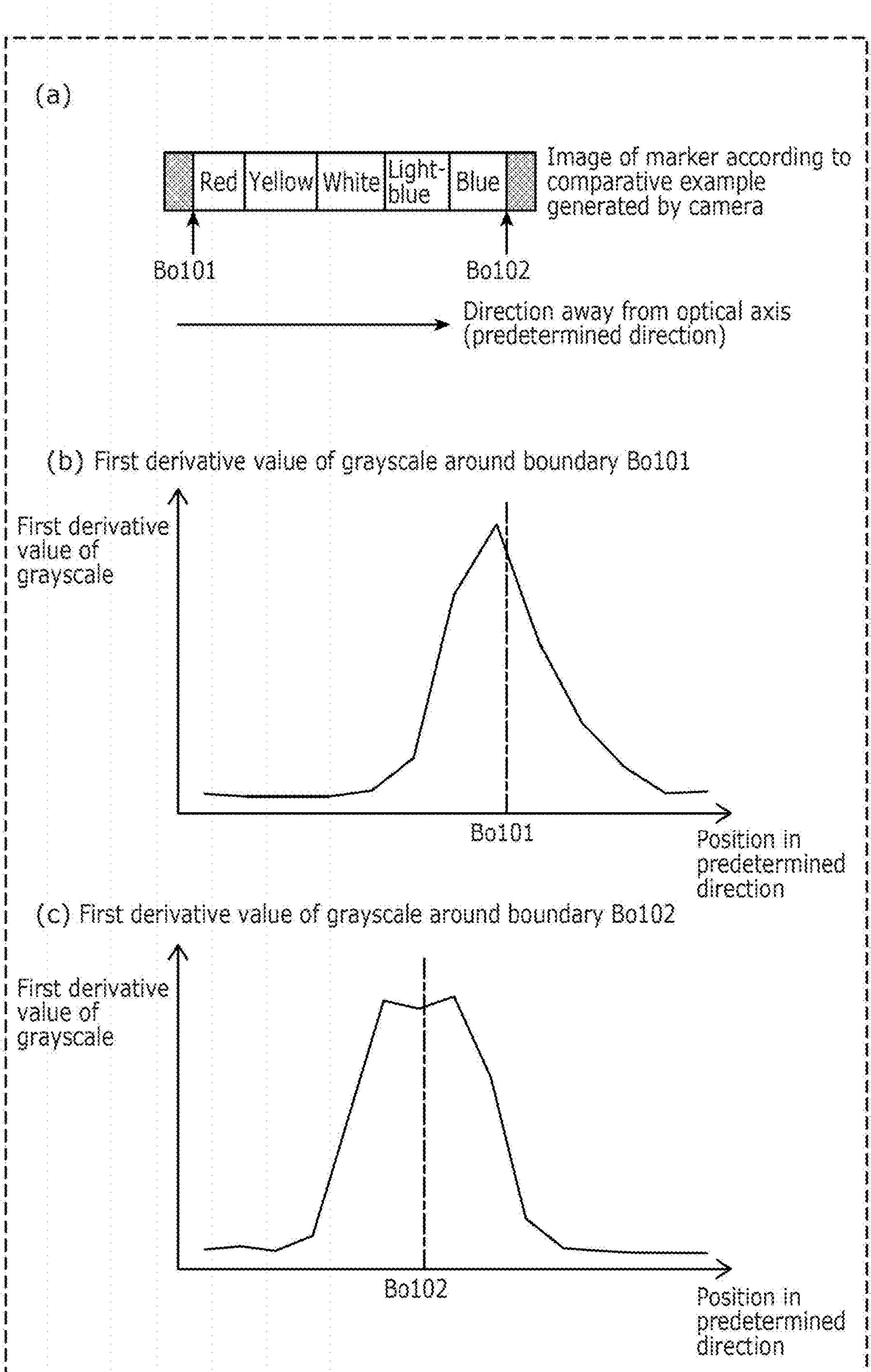
FIG. 9 illustrates graphs each of which shows an amount of change in a color property corresponding to positions in a predetermined direction at a different end of a white area in the marker according to the comparative example.

FIG. 9 illustrates graphs each of which shows an amount of change in a color property corresponding to positions in the predetermined direction at a different end of a white area in the marker according to the comparative example. The amount of change in the color property is, for example, a first derivative value of grayscale.

(a) in FIG. 9 is a schematic view of an image of marker 101 according to the comparative example generated by camera 200. As described above, an area around boundary Bo101 in white area A102 includes a red component area and a yellow component area, and an area around boundary Bo102 in white area A102 includes a light-blue component area and a blue component area. Boundary Bo101 is a boundary close to optical axis Ax of camera 200 with respect to the white component area, and boundary Bo102 is a boundary far from optical axis Ax of camera 200 with respect to the white component area.

(b) in FIG. 9 is a graph showing a first derivative value of grayscale corresponding to positions in the predetermined direction in an area around boundary Bo101. (c) in FIG. 9 is a graph showing a first derivative value of grayscale corresponding to positions in the predetermined direction in an area around boundary Bo102.

As indicated by these graphs, the area around boundary Bo101 and the area around boundary Bo102 are different in pattern of change in a first derivative value of grayscale corresponding to positions in the predetermined direction. While a graph having a shape in which the peak of the first derivative value of grayscale can be determined as one point is obtained from the area around boundary Bo101, a graph having a shape in which the peak of the first derivative value of grayscale is present throughout a certain range in the predetermined direction and is difficult to be determined as one point is obtained from the area around boundary Bo102. Accordingly, in the area around boundary Bo102, it is required to identify a boundary by calculating a centroid of the peak.

Thus, with marker 101 according to the comparative example, the position of a boundary cannot be precisely identified even when a simple boundary search is carried out since a pattern of change in a color property corresponding to positions in the predetermined direction may vary depending on the boundary.

Marker 100 in the present embodiment includes six areas A11 to A16 that are arranged adjacent to one another in the predetermined direction. An amount of change in brightness corresponding to positions in the predetermined direction is greater than or equal to the first threshold value at each of five boundaries Bo11 to Bo15 between six areas A11 to A16. In each of six areas A11 to A16, an amount of change in brightness corresponding to positions in the predetermined direction is less than or equal to a second threshold value that is less than the first threshold value. A pattern of change in brightness corresponding to positions in the predetermined direction is common among six areas A11 to A16.

Accordingly, in six areas A11 to A16 included in marker 100, an amount of change in brightness corresponding to positions in the predetermined direction is greater than or equal to the first threshold value at each of five boundaries Bo11 to Bo15 between six areas A11 to A16, and an amount of change in brightness inside each of six areas A11 to A16 is less than or equal to the second threshold value. Therefore, five boundaries Bo11 to Bo15 can be identified by detecting positions at each of which an amount of change in brightness is greater than or equal to the first threshold value. Moreover, since a pattern of change in brightness corresponding to positions in the predetermined direction is common among six areas A11 to A16, a mode of change in brightness can also be made common among five boundaries Bo11 to Bo15 between six areas A11 to A16. Accordingly, when an image of marker 100 is captured by a camera, even if the image is affected by a chromatic aberration caused by an optical system of the camera, the positions of five boundaries Bo11 to Bo15 in marker 100 can be precisely identified since a mode of change in brightness can be made common in the image.

FIG. 10 illustrates graphs each of which shows a first derivative value of grayscale corresponding to positions in the predetermined direction in an area around a boundary between two areas in the marker according to Embodiment 1. (a) in FIG. 10 is a graph for an area around boundary Bo11 in marker 100, (b) in FIG. 10 is a graph for an area around boundary Bo12, and (c) in FIG. 10 is a graph for an area around boundary Bo13.

As illustrated in FIG. 10, graphs in each of which a different one of peaks P1 to P3 can be easily determined as one point are obtained for boundaries Bo11 to Bo13. Thus, it can be seen that a pattern of change in grayscale is made common among areas around boundaries Bo11 to Bo13.

In each of six areas A11 to A16 in marker 100 according to the present embodiment, the brightness gradually increases or decreases from one end to the other end in the predetermined direction.

Therefore, it is possible to prevent erroneous detection of a boundary in each of six areas A11 to A16.

At each of five boundaries Bo11 to Bo15 in marker 100 according to the present embodiment, a position where the brightness is highest in one of two areas adjacent to each other across the boundary and a position where the brightness is lowest in the other of the two areas are adjacent to each other.

In order to make a mode of change in brightness common among five boundaries Bo11 to Bo15, an area in which brightness changes by the second threshold value or less corresponding to positions in the predetermined direction needs to be provided in each of six areas A11 to A16. Thus, since an area in which brightness changes by the second threshold value or less corresponding to positions in the predetermined direction is provided for each area in marker 100, five boundaries Bo11 to Bo15 can be easily identified by maximizing the amount of change in brightness at each of five boundaries Bo11 to Bo15. Accordingly, the positions of five boundaries Bo11 to Bo15 can be precisely identified.

Embodiment 2

Although marker 100 is a marker for measuring the size of object 10 in Embodiment 1, marker 100A according to Embodiment 2 is used for camera calibration of camera 200.

(2-1. Configuration)

Figure 11:
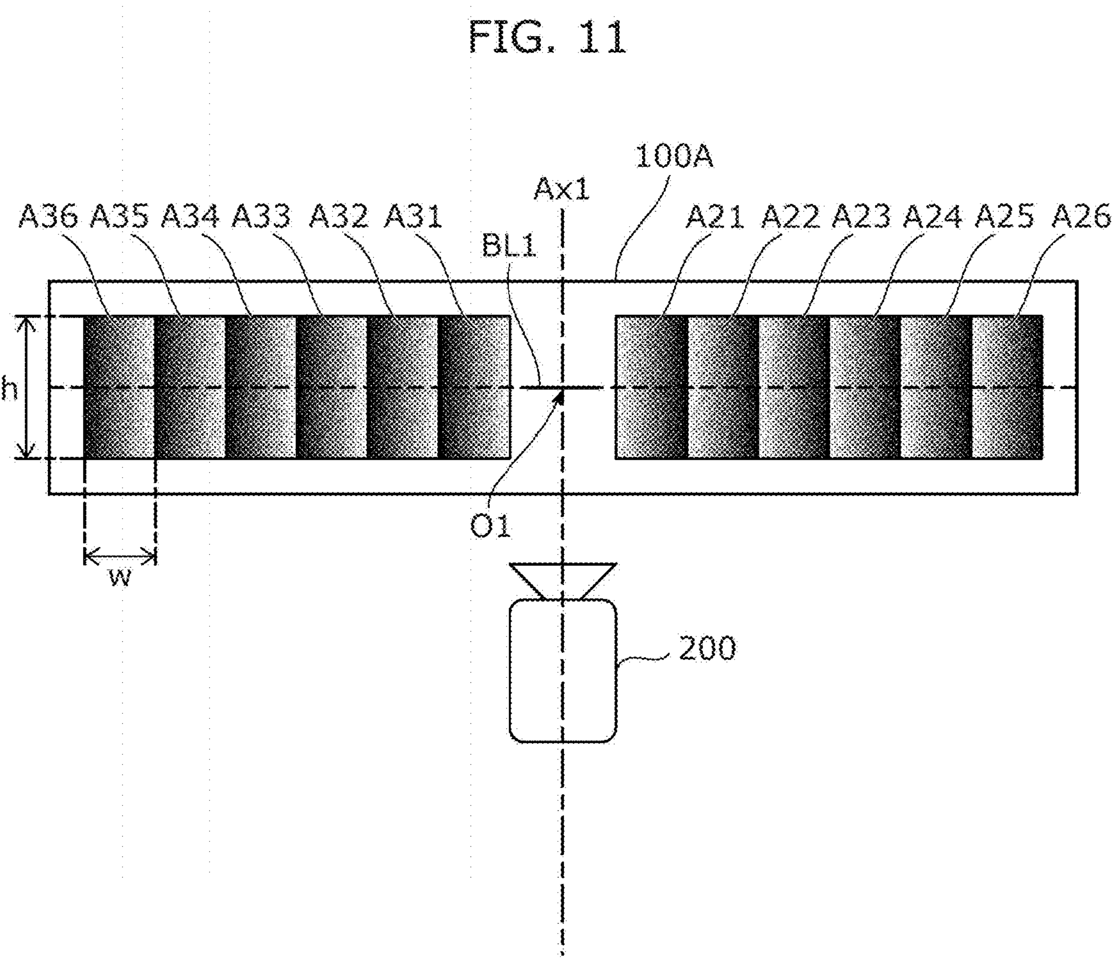
FIG. 11 illustrates an example of a configuration of a marker according to Embodiment 2.

FIG. 11 illustrates an example of a configuration of a marker according to Embodiment 2.

Marker 100A is disposed on optical axis Ax1 of camera 200 at a position where an image of marker 100A is captured by camera 200. Marker 100A includes six areas A21 to A26 arranged adjacent to one another in a predetermined direction (horizontal direction in this embodiment), six areas A31 to A36, and reference line BL1. Marker 100A is disposed such that reference line BL1 intersects optical axis Ax1 of camera 200. Reference line BL1 is disposed between six areas A21 to A26 and six areas A31 to A36 such that reference line BL1 intersects optical axis Ax1 of camera 200. Here, the point where reference line BL1 and optical axis Ax1 of camera 200 intersect each other is reference position O1. Six areas A21 to A26 are arranged on the extension of reference line BL1 on the positive side in the predetermined direction with respect to reference position O1 on optical axis Ax1 of camera 200 in marker 100A. Six areas A31 to A36 are arranged on the extension of reference line BL1 on the opposite side to the positive side in the predetermined direction with respect to reference position O1 in marker 100A. In other words, six areas A21 to A26 are arranged on the opposite side to six areas A31 to A36, across optical axis Ax1 of camera 200 and reference position O1. It should be noted that six areas A21 to A26 are an example of N first areas, and six areas A31 to A36 are an example of M (M is an integer greater than or equal to 3) second areas.

It should be noted that six areas A21 to A26 are the same as six areas A11 to A16 in marker 100. Moreover, six areas A31 to A36 have the configuration obtained by reversing six areas A21 to A26 with respect to reference position O1.

In other words, the following can be described for six areas A21 to A26 and six areas A31 to A36. An amount of change in brightness corresponding to positions in the predetermined direction is greater than or equal to the first threshold value at each of five boundaries between six areas A31 to A36. An amount of change in brightness corresponding to positions in the predetermined direction is less than or equal to the second threshold value inside each of six areas A31 to A36. In marker 100A, a pattern of change in brightness corresponding to positions in the predetermined direction is common among six areas A21 to A26. A first pattern of change in brightness in a direction away from reference position O1 in each of six areas A21 to A26 and a second pattern of change in brightness in a direction away from reference position O1 in each of six areas A31 to A36 are common to each other.

It should be noted that a position where the brightness is lowest and a position where the brightness is highest are adjacent to each other in the stated order in the direction away from reference position O1 at each of boundaries between six areas A21 to A26 and in the direction away from reference position O1 at each of boundaries between six areas A31 to A36.

Next, a configuration of information processing device 300A according to Embodiment 2 is described.

Figure 12:
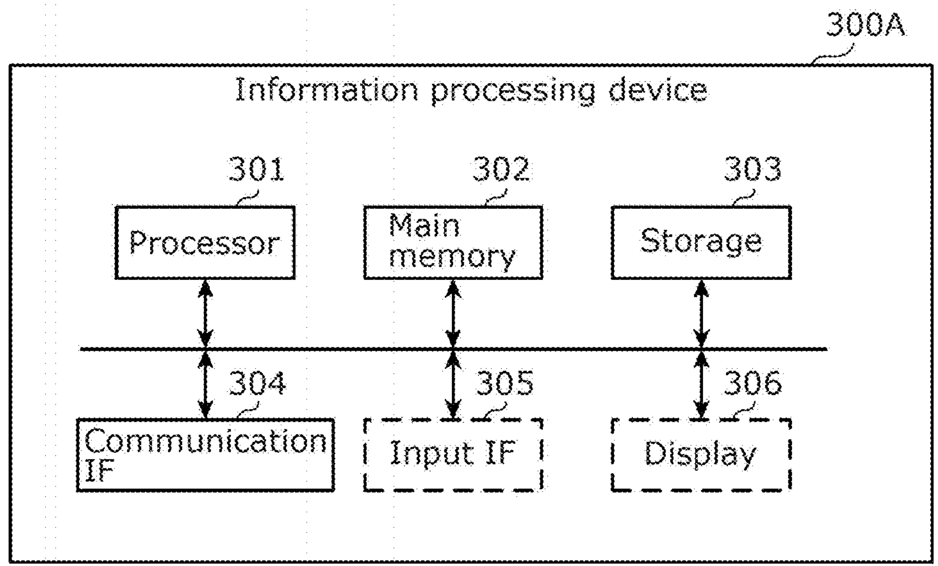
FIG. 12 is a block diagram illustrating an example of a configuration of an information processing device according to Embodiment 2.

FIG. 12 is a block diagram illustrating an example of a configuration of an information processing device according to Embodiment 2.

Since a hardware configuration of information processing device 300A is the same as the hardware configuration of information processing device 300, a description thereof is omitted.

Figure 13:
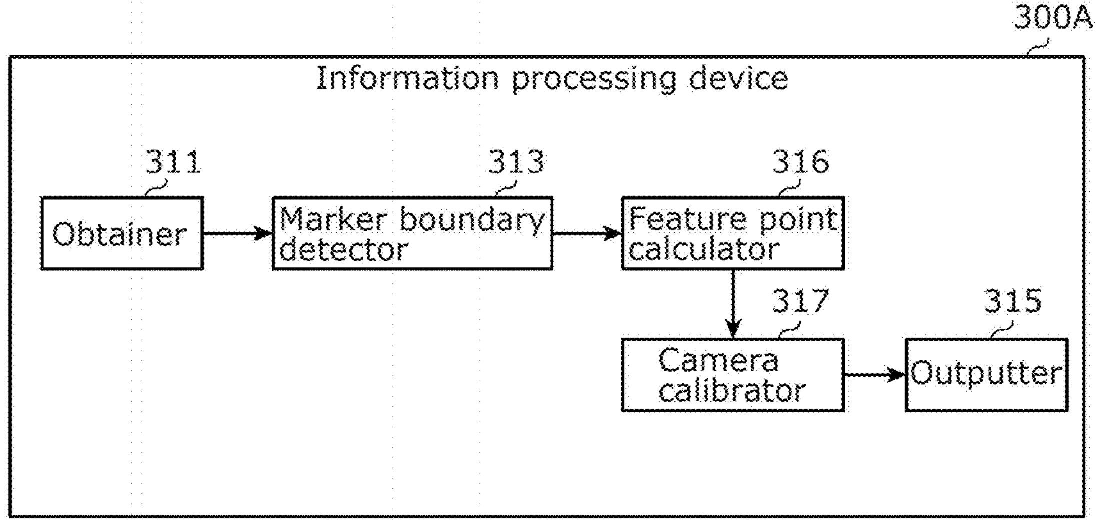
FIG. 13 is a block diagram illustrating an example of a functional configuration of the information processing device according to Embodiment 2.

FIG. 13 is a block diagram illustrating an example of a functional configuration of the information processing device according to Embodiment 2.

As illustrated in FIG. 13, information processing device 300A functionally includes obtainer 311, marker boundary detector 313, feature point calculator 316, camera calibrator 317, and outputter 315.

Obtainer 311 obtains an image from camera 200. For example, obtainer 311 is realized with communication IF 304 or the like.

Marker boundary detector 313 detects reference line BL1, determines, as a predetermined boundary detection direction, the direction of reference line BL1 detected, and detects, similar to Embodiment 1, five boundaries between six areas A21 to A26 on the extension of reference line BL1 and five boundaries between six areas A31 to A36 on the extension of reference line BL1 on the opposite side to six areas A21 to A26 with respect to reference position O1 in marker 100A, based on grayscale change. It should be noted that if the positional relationship between marker 100A and camera 200 is fixed, marker boundary detector 313 may set a certain direction as the predetermined boundary detection direction. In other words, marker boundary detector 313 does not necessarily detect reference line BL1.

Feature point calculator 316 obtains physical coordinates in marker 100A corresponding to feature points of marker 100A, based on feature information indicating a feature of marker 100A, and associates the physical coordinates with the positions of ten boundaries detected by marker boundary detector 313. The feature points are provided at positions corresponding to the positions of the boundaries in marker 100A.

Camera calibrator 317 calculates external parameters and internal parameters of camera 200 by using the result of associating the physical coordinates with the ten boundary positions detected by marker boundary detector 313. For example, camera calibrator 317 calculates external parameters and internal parameters by using at least one of Perspective camera model, Zhang's method, or Scaramuzza model.

Outputter 315 outputs the external parameters and the internal parameters calculated. Outputter 315 may be realized as communication IF 304 or display 306, or may be stored in storage 303.

It should be noted that each of marker boundary detector 313, feature point calculator 316, and camera calibrator 317 is realized by processor 301, main memory 302, storage 303, etc., for example.

(2-2. Operations)

FIG. 14 is a flowchart showing an example of operations performed by the information processing device according to Embodiment 2.

Information processing device 300A obtains an image from camera 200 (S11). The process in step S11 is a process performed by obtainer 311.

Next, information processing device 300A detects reference line BL1, determines, as a predetermined boundary detection direction, the direction of reference line BL1 detected, and detects five boundaries between six areas A21 to A26 and five boundaries between six areas A31 to A36 in marker 100A (S12). The process in step S12 is a process performed by marker boundary detector 313.

Next, information processing device 300A obtains physical coordinates in marker 100A corresponding to feature points of marker 100A, based on feature information indicating a feature of marker 100A, and associates the physical coordinates with the positions of ten boundaries detected by marker boundary detector 313 (S13). The process in step S13 is a process performed by feature point calculator 316.

Next, information processing device 300A calculates external parameters and internal parameters of camera 200 (S14). The process in step S14 is a process performed by camera calibrator 317.

(2-3. Advantageous Effects, Etc.)

Marker 100A according to the present embodiment includes six areas A21 to A26 arranged in a predetermined direction, six areas A31 to A36, and reference line BL1. Marker 100A is disposed at a position to be captured by camera 200 such that reference line BL1 intersects optical axis Ax1 of camera 200. Six areas A21 to A26 are arranged on the positive side in the predetermined direction with respect to reference position O1 on optical axis Ax1 of camera 200 in marker 100A. Six areas A31 to A36 are arranged on the opposite side to the positive side in the predetermined direction with respect to reference position O1 in marker 100A. An amount of change in brightness corresponding to positions in the predetermined direction is greater than or equal to the first threshold value at each of five boundaries between six areas A31 to A36. An amount of change in brightness corresponding to positions in the predetermined direction is less than or equal to the second threshold value inside each of six areas A31 to A36. A pattern of change in brightness corresponding to positions in the predetermined direction is common among six areas A31 to A36. A first pattern of change in brightness in a direction away from reference position O1 in each of six areas A21 to A26 and a second pattern of change in brightness in a direction away from reference position O1 in each of six areas A31 to A36 are common to each other.

For an image of marker 100A captured by camera 200, a chromatic aberration caused by an optical system (lens) of camera 200 shows that the appearance of the chromatic aberration on one side of optical axis Ax1 of the optical system in the direction perpendicular to optical axis Ax1 has a tendency opposite to that on the other side of optical axis Ax1 in the direction perpendicular to optical axis Ax1. Therefore, a mode of change in brightness can be made common among ten boundaries in the image of marker 100A captured, by arranging six areas A21 to A26 on one side with respect to reference position O1 on optical axis Ax1 of camera 200 and six areas A31 to A36 on the other side with respect to reference position O1. Accordingly, when an image of marker 100A is captured by camera 200, even if the image is affected by a chromatic aberration caused by the optical system of camera 200, a mode of change in brightness can be made common in the image. Accordingly, the positions of the ten boundaries in marker 100A can be precisely identified.

In marker 100A according to the present embodiment, the color property is brightness. At each of the ten boundaries, a position where the brightness is lowest and a position where the brightness is highest are adjacent to each other in the stated order in a direction away from reference position O1.

The number of peaks in an amount of change in brightness can be limited to one at a boundary formed by arranging a position where the brightness is lowest and a position where the brightness is highest adjacent to each other in the stated order in a direction away from reference position O1. Accordingly, the positions of the ten boundaries can be precisely identified.

(2-4. Variation 1)

Figure 15:
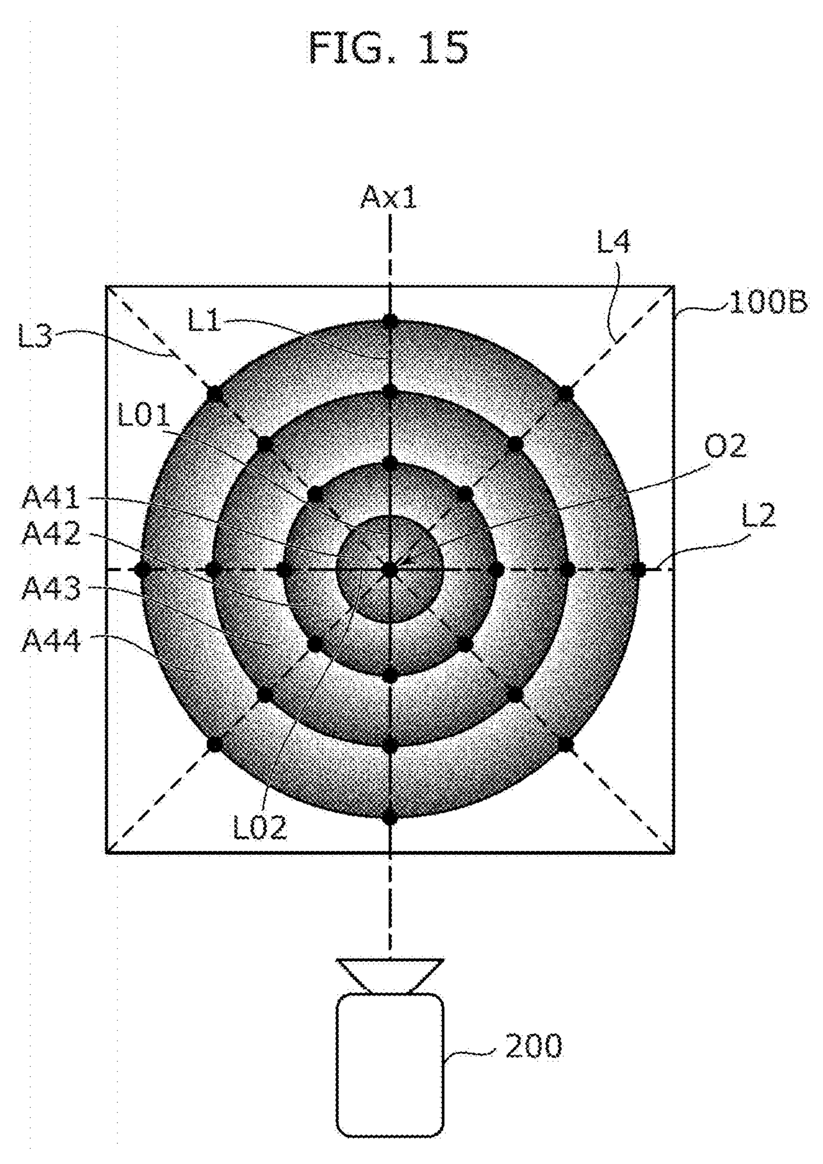
FIG. 15 illustrates an example of a configuration of a marker according to Variation 1 of Embodiment 2.

FIG. 15 illustrates an example of a configuration of a marker according to Variation 1 of Embodiment 2.

Marker 100B according to Variation 1 includes third areas A41 to A44 defined by circles having different diameters centered at reference position O2. Each of third areas A41 to A44 include an area having the same configuration as the configuration of each of six areas A21 to A26 and an area having the same configuration as the configuration of each of six areas A31 to A36 described in Embodiment 2. Specifically, each of third areas A41 to A44 is configured so that the brightness decreases in a direction away from reference position O2. In other words, in third area A41, the configuration of an area on one side in a predetermined direction and the configuration of an area on the opposite side to the one side in the predetermined direction are symmetrical with respect to reference position O2. The same applies to other third areas A42 to A44. Accordingly, it can be said that marker 100B includes the configuration similar to the configuration of marker 100A. Moreover, marker 100B includes two reference lines L01 and L02 crossing each other at reference position O2. It should be noted that the number of third areas is not limited to four and may be N (N>3). Moreover, each of third areas may be configured so that the brightness increases in a direction away from reference position O2.

Next, a configuration of information processing device 300B according to Variation 1 of Embodiment 2 is described.

Figure 16:
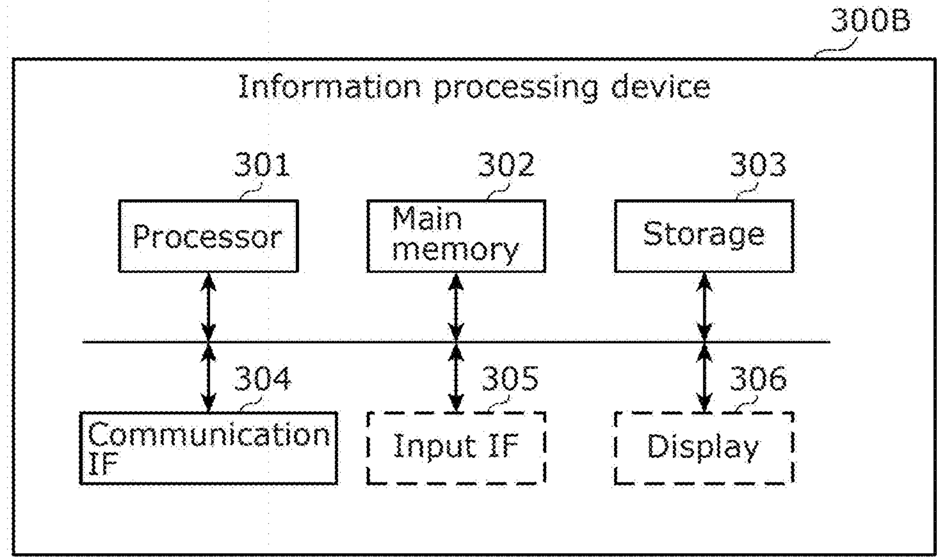
FIG. 16 is a block diagram illustrating an example of a configuration of an information processing device according to Variation 1 of Embodiment 2.

FIG. 16 is a block diagram illustrating an example of a configuration of the information processing device according to Variation 1 of Embodiment 2.

Since a hardware configuration of information processing device 300B is the same as the hardware configuration of information processing device 300, a description thereof is omitted.

Figure 17:
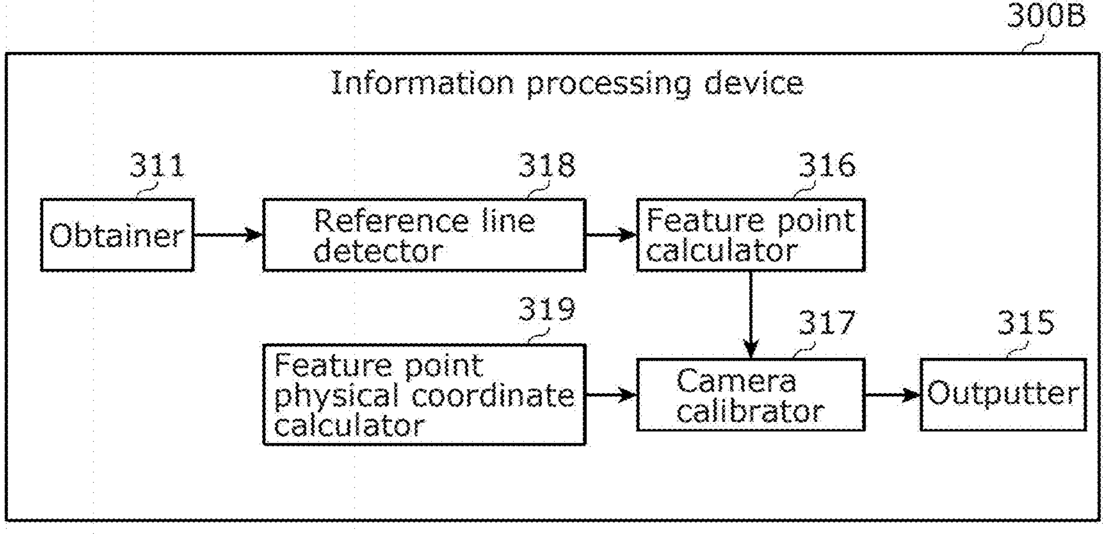
FIG. 17 is a block diagram illustrating an example of a functional configuration of the information processing device according to Variation 1 of Embodiment 2.

FIG. 17 is a block diagram illustrating an example of a functional configuration of the information processing device according to Variation 1 of Embodiment 2.

As illustrated in FIG. 17, information processing device 300B functionally includes obtainer 311, reference line detector 318, feature point calculator 316, feature point physical coordinate calculator 319, camera calibrator 317, and outputter 315.

Obtainer 311 obtains an image from camera 200. For example, obtainer 311 is realized as communication IF 304 or the like.

Reference line detector 318 detects two reference lines L01 and L02 on marker 100B.

Feature point calculator 316 sets virtual line L1 that is the extension of reference line L01 and virtual line L2 that is the extension of reference line L02 as boundary detection directions (predetermined directions), based on reference lines L01 and L02 detected by reference line detector 318. Then, similar to marker boundary detector 313, feature point calculator 316 detects, for each of the boundary detection directions, six concentric boundaries between areas A41 to A44 in marker 100B, and detects, as feature points, intersections of the six concentric boundaries and virtual line L1 and intersections of the six concentric boundaries and virtual line L2. Feature point calculator 316 generates two virtual lines L3 and L4 based on two reference lines L01 and L02, and detects, as feature points, intersections of the six concentric boundaries and virtual line L3 and intersections of the six concentric boundaries and virtual line L4. Two virtual lines L3 and L4 are generated by rotating two virtual lines L1 and L2 45 degrees about reference position O2.

Feature point physical coordinate calculator 319 obtains feature information indicating a feature of marker 100B based on reference lines L01 and L02 of marker 100B, obtains physical coordinates in marker 100B corresponding to feature points of marker 100B calculated by feature point calculator 316 based on the feature information, and associates the feature points detected with the physical coordinates of the feature points. The feature information indicating a feature of marker 100B includes, for example, the size of each of the reference lines, the size of each of the third areas in marker 100B, and the positional relationship between reference position O2 and reference lines, together with each of the third areas.

Camera calibrator 317 calculates external parameters and internal parameters of camera 200 by using the result of associating the feature points detected with the physical coordinates of the feature points. For example, camera calibrator 317 calculates external parameters and internal parameters by using at least one of Perspective camera model, Zhang's method, or Scaramuzza model.

Outputter 315 outputs the external parameters and the internal parameters calculated. Outputter 315 may be realized as communication IF 304 or display 306, or may be stored in storage 303.

It should be noted that each of reference line detector 318, feature point calculator 316, feature point physical coordinate calculator 319, and camera calibrator 317 is realized by processor 301, main memory 302, storage 303, etc., for example.

Figure 18:
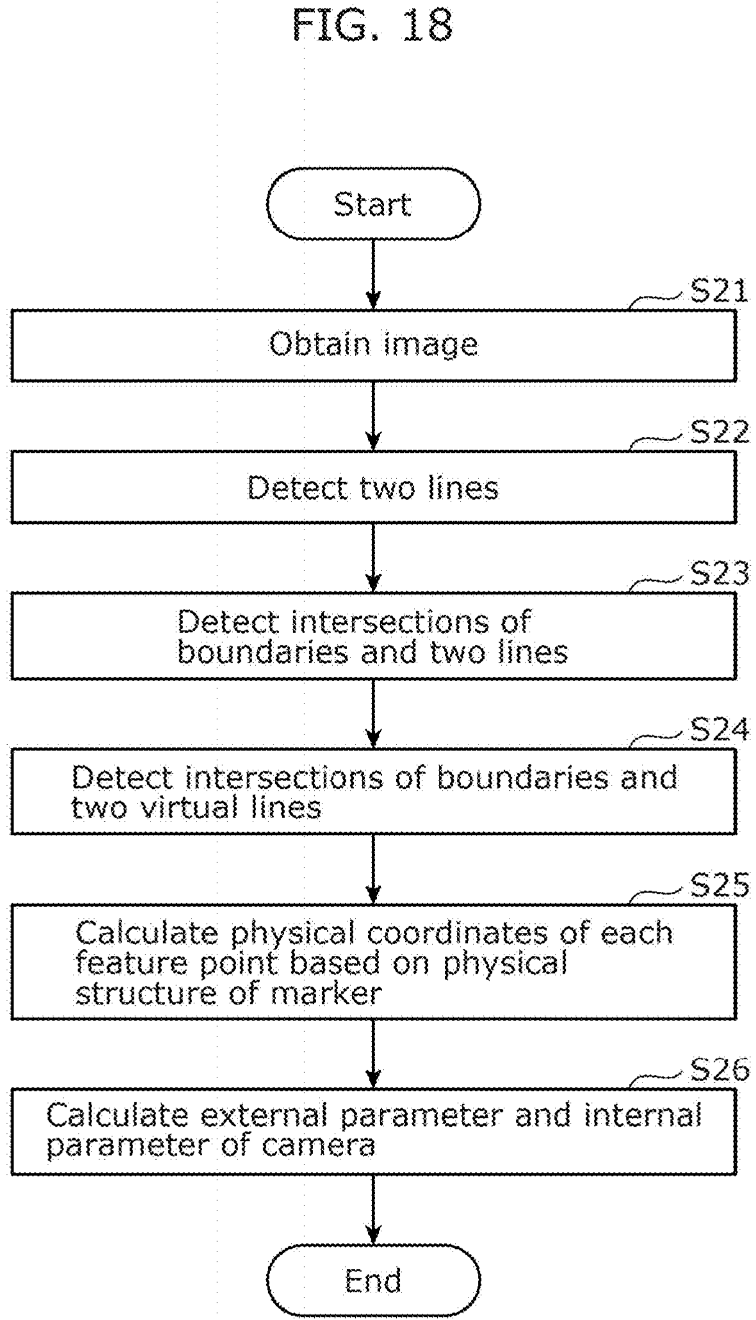
FIG. 18 is a flowchart showing an example of operations performed by the information processing device according to Variation 1 of Embodiment 2.

FIG. 18 is a flowchart showing an example of operations performed by the information processing device according to Variation 1 of Embodiment 2.

Information processing device 300B obtains an image from camera 200 (S21). The process in step S21 is a process performed by obtainer 311.

Next, information processing device 300B detects two reference lines L01 and L02 on marker 100B (S22). The process in step S22 is a process performed by reference line detector 318.

Next, information processing device 300B detects, for each of boundary detection directions (predetermined directions) set by virtual lines L1 and L2 based on reference lines L01 and L02 detected, six concentric boundaries between areas A41 to A44 in marker 100B similar to the process in Embodiment 1, and detects, as feature points, intersections of the six boundaries and virtual line L1 and intersections of the six boundaries and virtual line L2 (S23). The process in step S23 is a process performed by feature point calculator 316.

Next, information processing device 300B further generates two virtual lines L3 and L4 based on two virtual lines L1 and L2, detects, for each of boundary detection directions (predetermined directions) set by two virtual lines L3 and L4, the six concentric boundaries similar to the process in Embodiment 1, and detects, as feature points, intersections of the six concentric boundaries and virtual line L3 and intersections of the six concentric boundaries and virtual line L4 (S24). The process in step S24 is a process performed by feature point calculator 316.

Next, information processing device 300B obtains feature information indicating a feature of marker 100B based on reference lines L01 and L02 in marker 100B, obtains physical coordinates of positions corresponding to feature points of marker 100B based on the feature information, and associates the feature points detected with the physical coordinates of the feature points (S25). The process in step S25 is a process performed by feature point physical coordinate calculator 319.

Next, information processing device 300B calculates external parameters and internal parameters of camera 200 (S26). The process in step S26 is a process performed by camera calibrator 317.

(2-5. Variation 2)

Although marker 100A according to Embodiment 2 is used for camera calibration of a standalone camera 200, the present disclosure is not limited to this example and marker 100A according to Embodiment 2 may be used for camera calibration of camera 200 mounted on vehicle 400. Camera 200 is a camera that captures an image of the front of vehicle 400.

Figure 19:
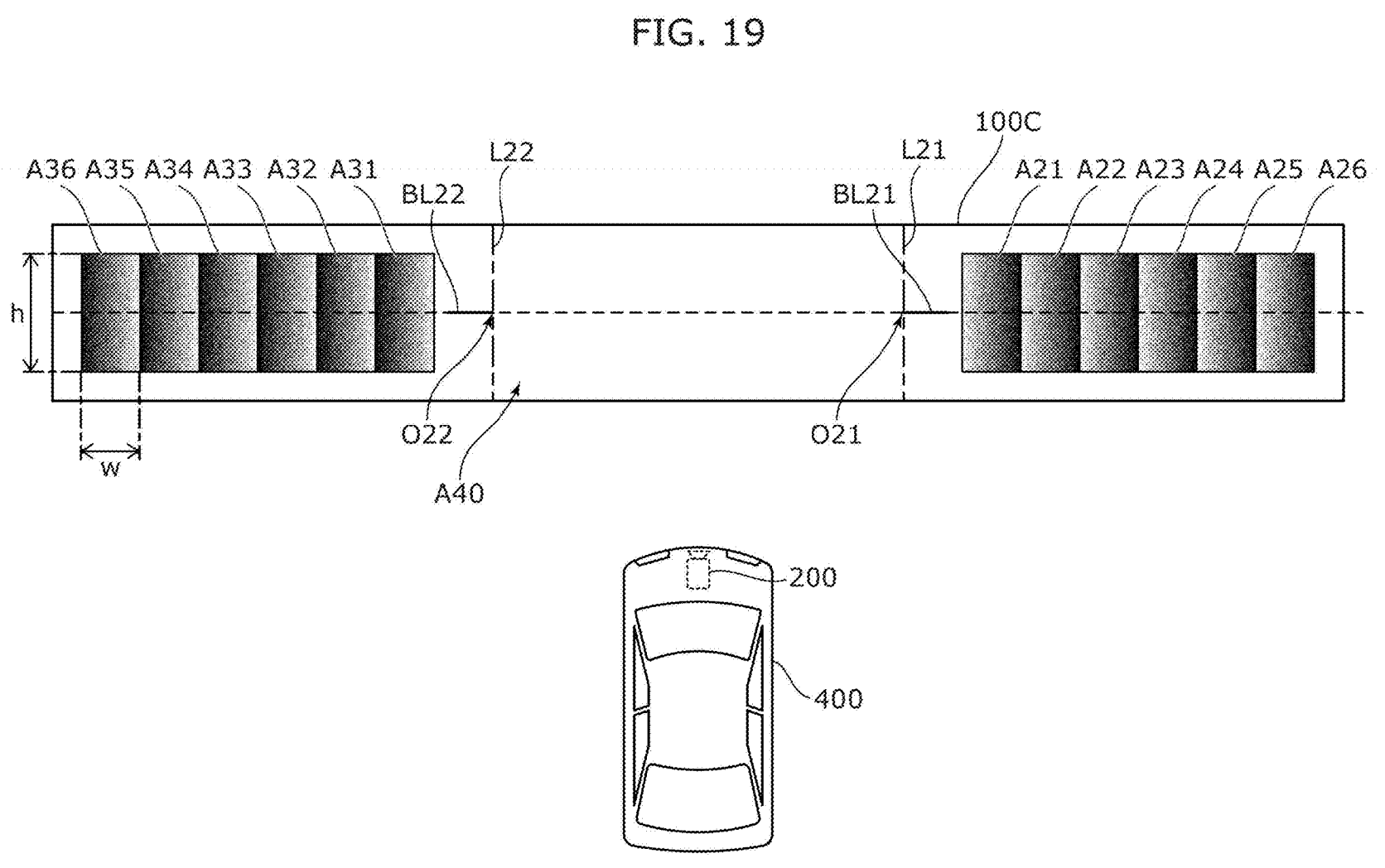

FIG. 19 illustrates an example of a configuration of a marker according to Variation 2 of Embodiment 2. FIG. 19 is a top view of a marker and a vehicle as viewed from above.

Similar to marker 100A, marker 100C includes six areas A21 to A26 arranged adjacent to one another in a predetermined direction (horizontal direction in this embodiment) and six areas A31 to A36. Marker 100C is different from marker 100A in that passage area A40 through which vehicle 400 can pass is provided between six areas A21 to A26 and six areas A31 to A36. Passage area A40 is defined by two straight lines L21 and L22 extending in a front-back direction of vehicle 400. In other words, passage area A40 is set between two straight lines L21 and L22 in marker 100C.

Moreover, marker 100C includes reference line BL21 that is provided in a position close to six areas A21 to A26 arranged on the right side of vehicle 400, and reference line BL22 that is provided in a position close to six areas A31 to A36 arranged on the left side of vehicle 400. Reference lines BL21 and BL22 are straight lines that are parallel to the predetermined direction (horizontal direction in this embodiment).

Here, the point where reference line BL21 and straight line L21 intersect each other is reference position O21, and the point where reference line BL22 and straight line L22 intersect each other is reference position O22. It should be noted that reference lines BL21 and BL22 may be formed by a single straight line. Moreover, a straight line extending parallel to the front-back direction of vehicle 400 and passing through the center of marker 100C in the horizontal direction may be provided instead of straight lines L21 and L22. In this case, an intersection of the straight line passing through the center of marker 100C in the horizontal direction and the single straight line may be determined as a reference position.

Marker 100C according to Variation 2 of Embodiment 2 is, for example, disposed along a floor surface on which vehicle 400 is disposed.

Figure 20:
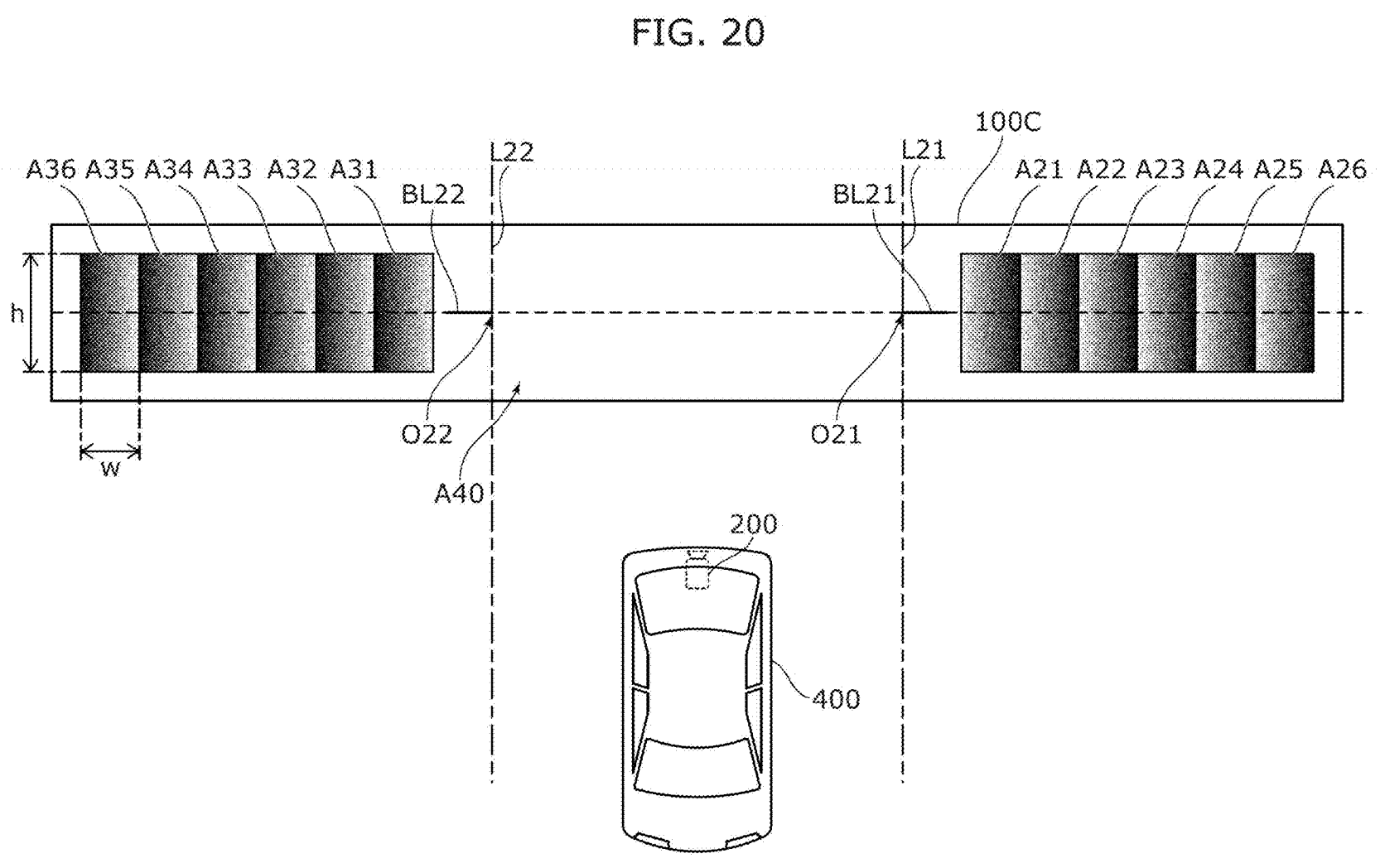

It should be noted that as illustrated in FIG. 20, marker 100C may be used for a configuration for camera 200 that captures an image of the back of vehicle 400. FIG. 20 is a top view of a marker and a vehicle as viewed from above.

(2-6. Variation 3)

Figure 21:
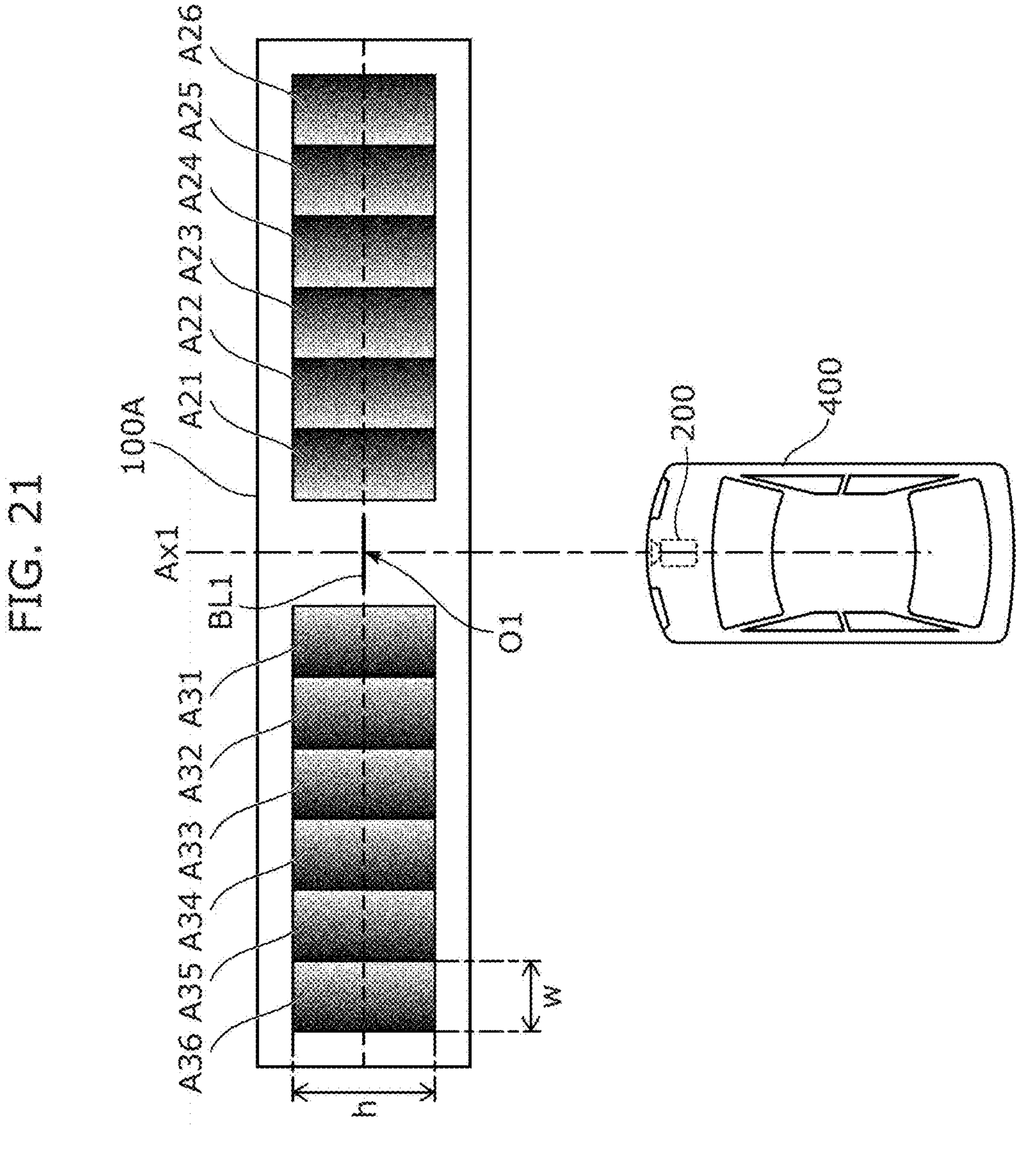
FIG. 21 illustrates an example of a configuration of a marker according to Variation 3 of Embodiment 2.
Figure 22:
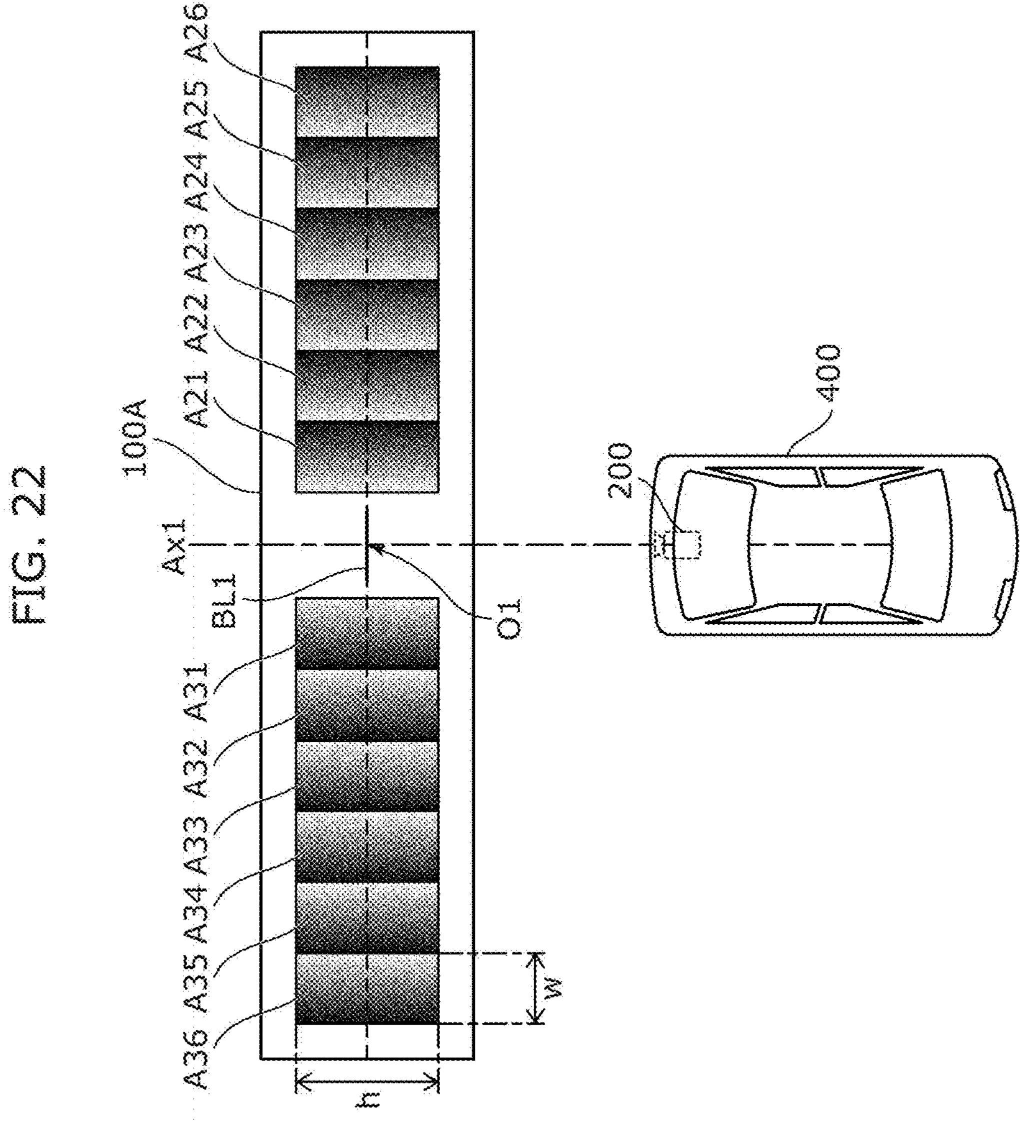
FIG. 22 illustrates an example of the configuration of the marker according to Variation 3 of Embodiment 2.

Although marker 100C according to Variation 2 of Embodiment 2 is used for camera calibration of camera 200 included in vehicle 400, the present disclosure is not limited to this example. As illustrated in FIG. 21, marker 100A according to Embodiment 2 may be used for camera calibration of camera 200 that captures an image of the front of vehicle 400. Moreover, as illustrated in FIG. 22, marker 100A according to Embodiment 2 may be used for camera calibration of camera 200 that captures an image of the back of vehicle 400. Each of FIG. 21 and FIG. 22 is a top view of a marker and a vehicle as viewed from above.

Figure 23:
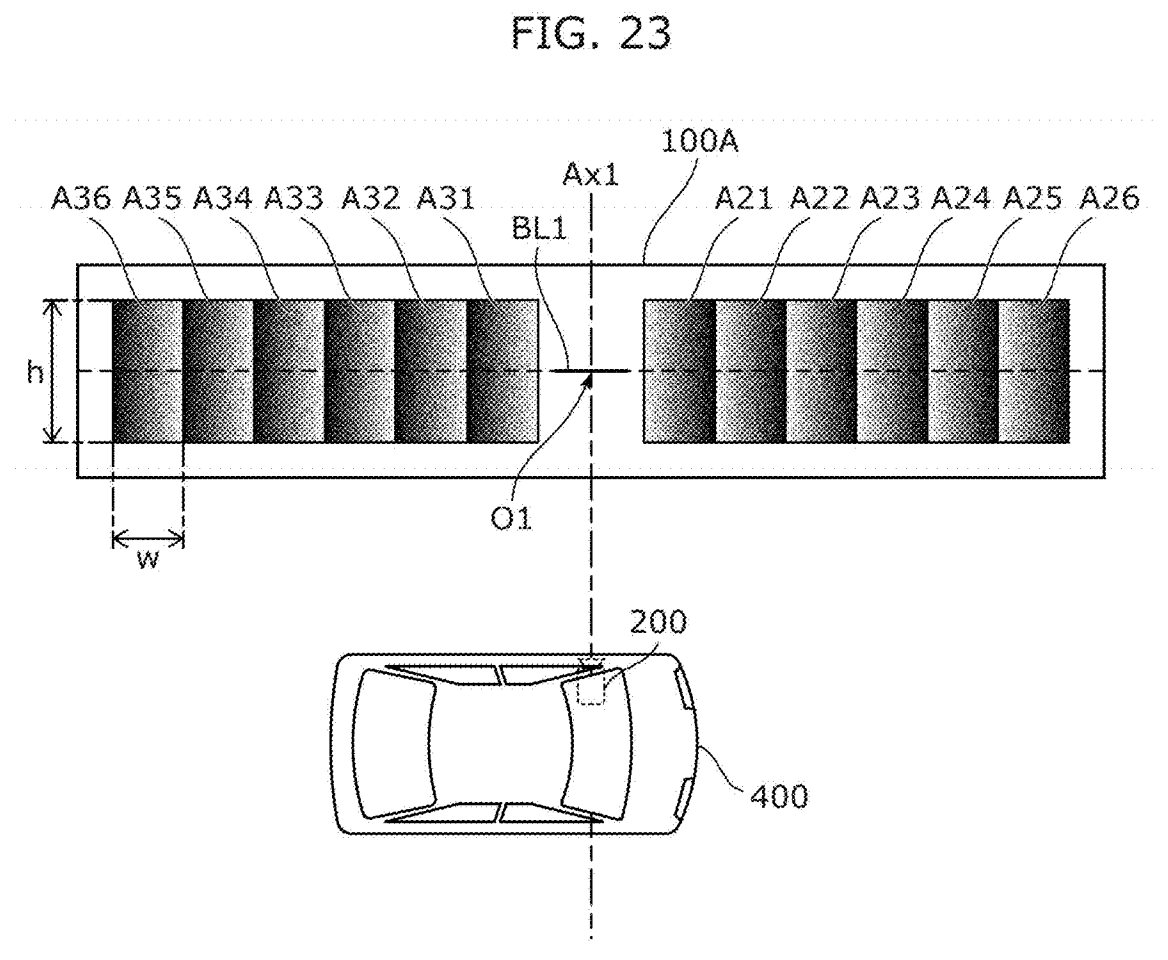
Figure 24:
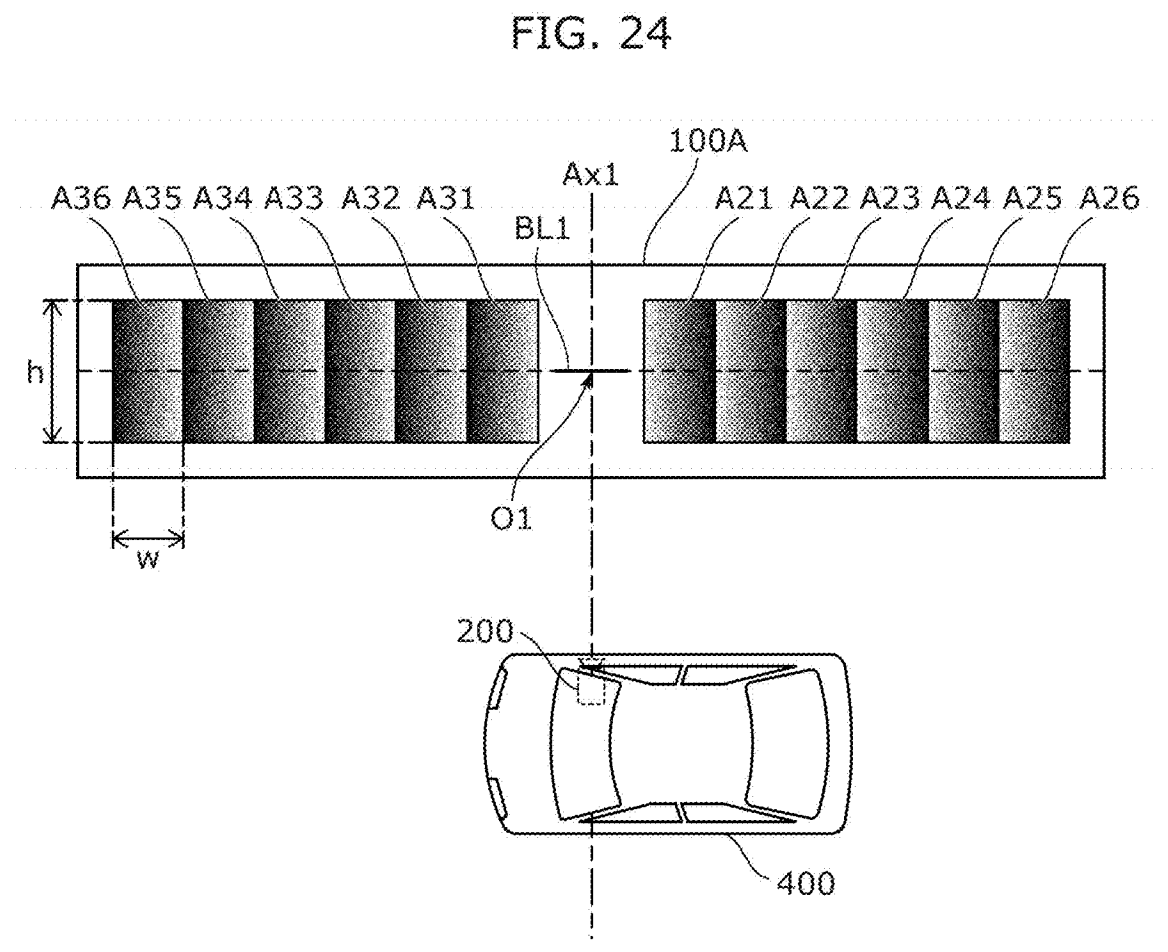

Moreover, as illustrated in FIG. 23 and FIG. 24, marker 100A according to Embodiment 2 may be used for camera calibration of camera 200 that captures an image of the left or the right of vehicle 400. Each of FIG. 23 and FIG. 24 is a top view of a marker and a vehicle as viewed from above. FIG. 23 is a top view of a marker and a vehicle as viewed from above when camera 200 is mounted on a left side of vehicle 400. FIG. 24 is a top view of a marker and a vehicle as viewed from above when camera 200 is provided on the right side of vehicle 400.

Marker 100A according to Variation 3 of Embodiment 2 is, for example, disposed along a floor surface on which vehicle 400 is disposed.

(2-7. Variation 4)

Figure 25:
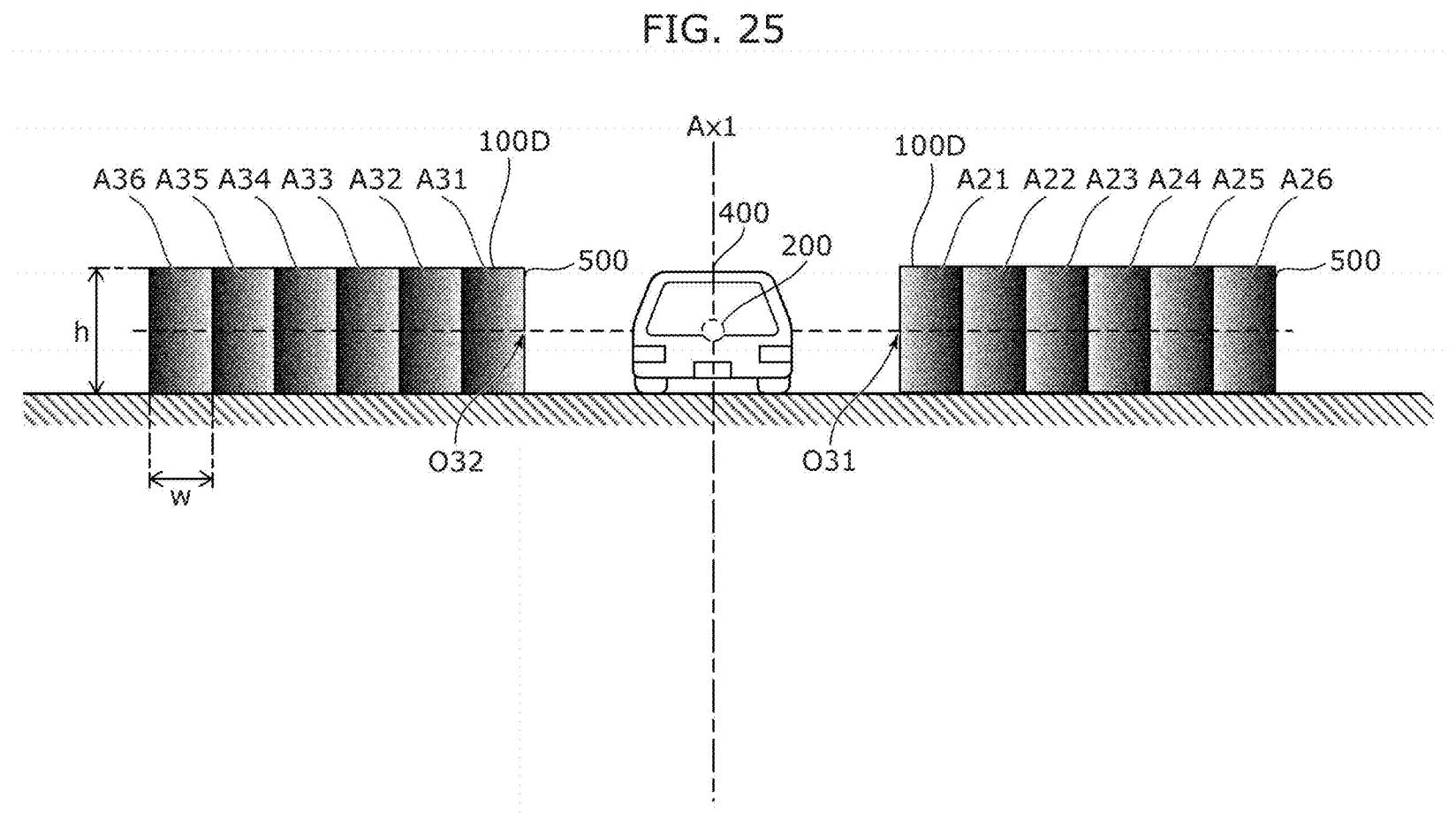
Figure 26:
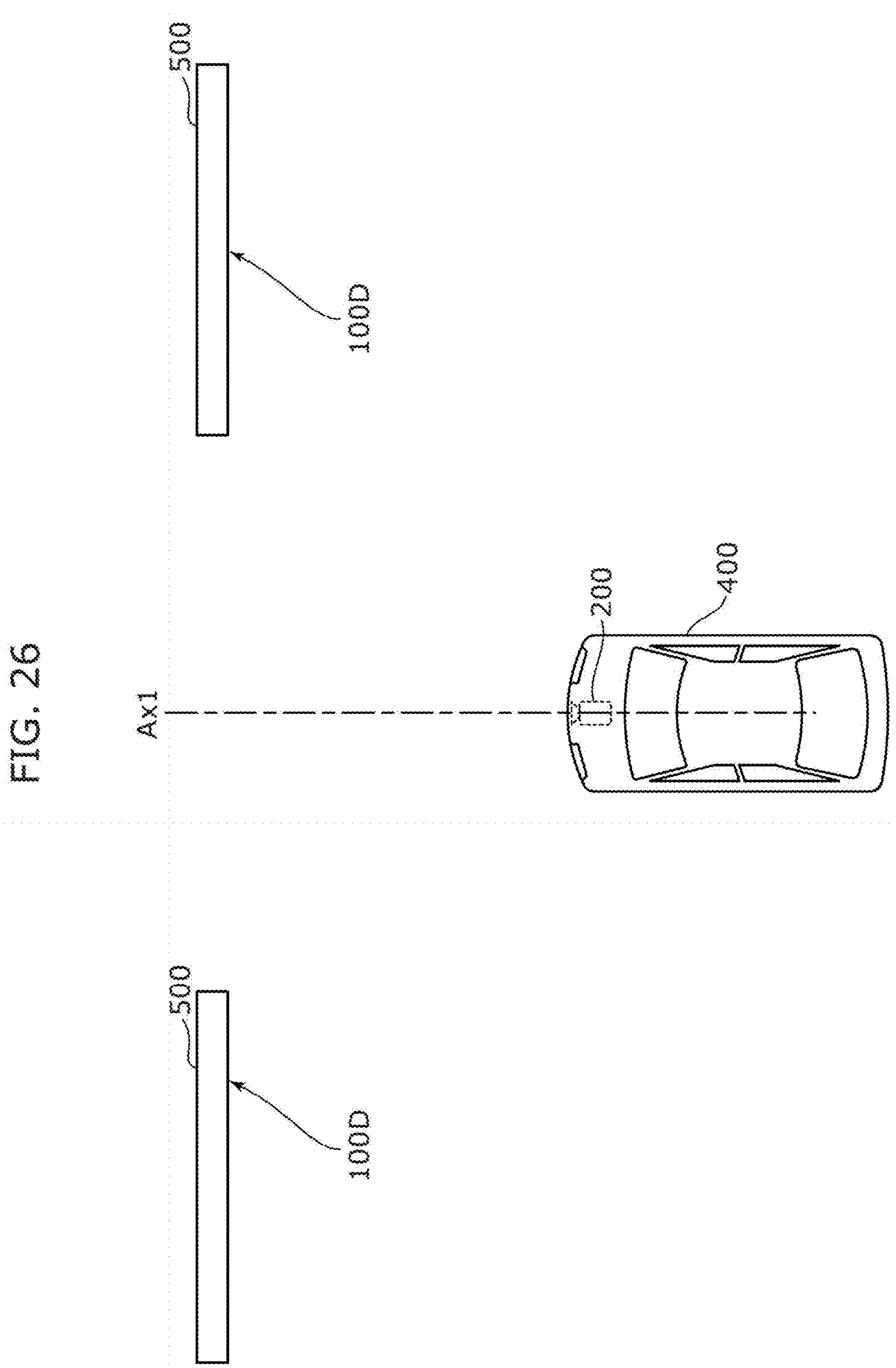
FIG. 26 illustrates an example of the configuration of the marker according to Variation 4 of Embodiment 2.

Although each of marker 100C according to Variation 2 of Embodiment 2 and marker 100A according to Variation 3 of Embodiment 2 is disposed along a floor surface on which vehicle 400 is disposed, the present disclosure is not limited to this example. As illustrated in FIG. 25 and FIG. 26, marker 100C according to Embodiment 2 may be marker 100D that stands on a floor surface. Marker 100D is provided on vehicle 400-side surfaces of plate-like members 500 standing on a floor surface such that marker 100D is perpendicular to a front-back direction of vehicle 400. In marker 100D according to Variation 4, the middle point of a side closer to vehicle 400, among two sides of one of plate-like members 500 extending in the vertical direction, may be determined as reference position O31, and the middle point of a side closer to vehicle 400, among two sides of the other of plate-like members 500 extending in the vertical direction, may be determined as reference position O32.

FIG. 25 is a view of a marker and a vehicle as viewed in a front-back direction. FIG. 26 is a top view of a marker and a vehicle as viewed from above.

It should be noted that although camera 200 that captures an image of the front of vehicle 400 is illustrated as an example in FIG. 26, the present disclosure is not limited to this example and marker 100D according to Variation 4 may be applied to camera 200 that captures an image of the back of vehicle 400.

Figure 27:
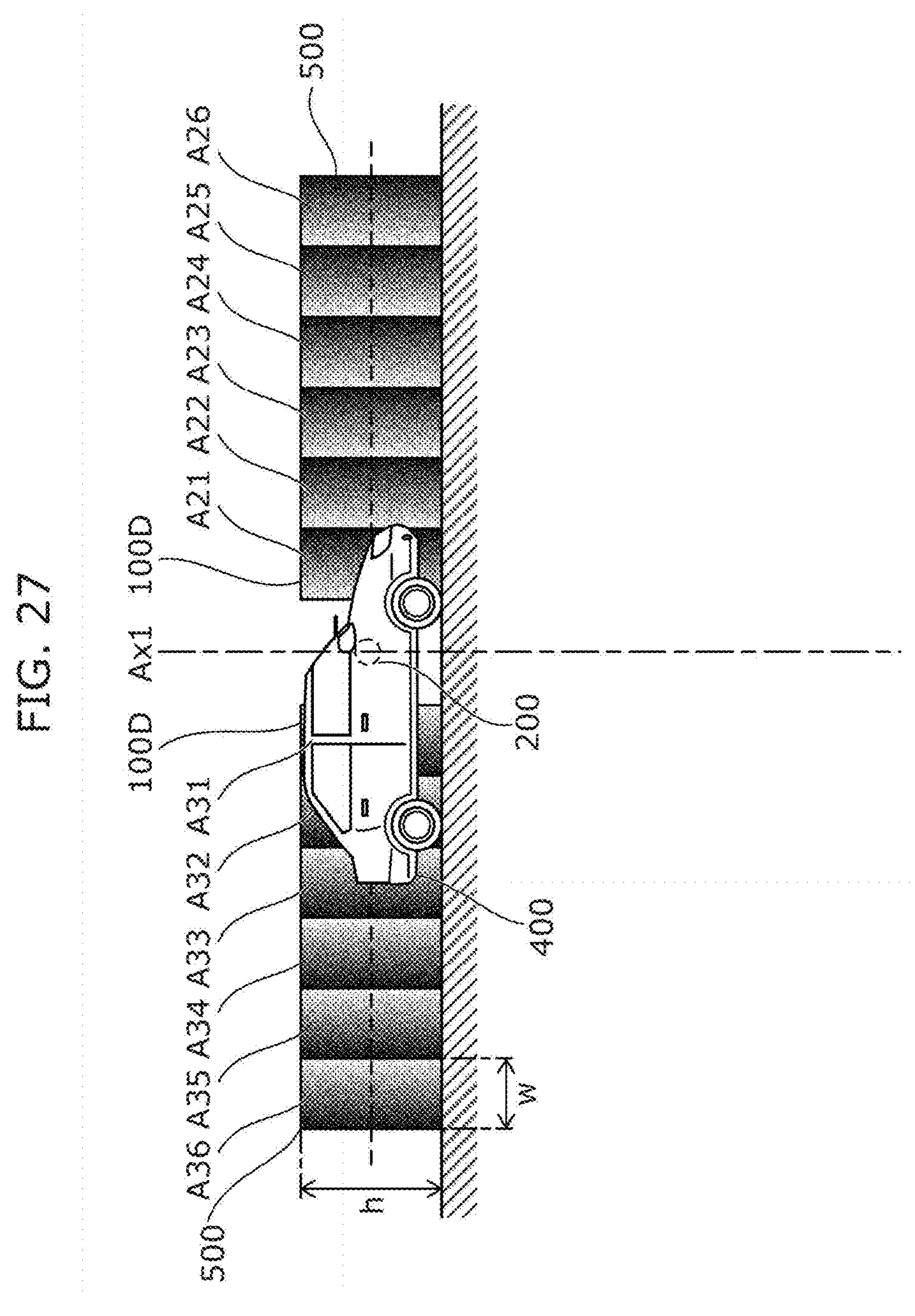
FIG. 27 illustrates another example of the configuration of the marker according to Variation 4 of Embodiment 2.
Figure 28:
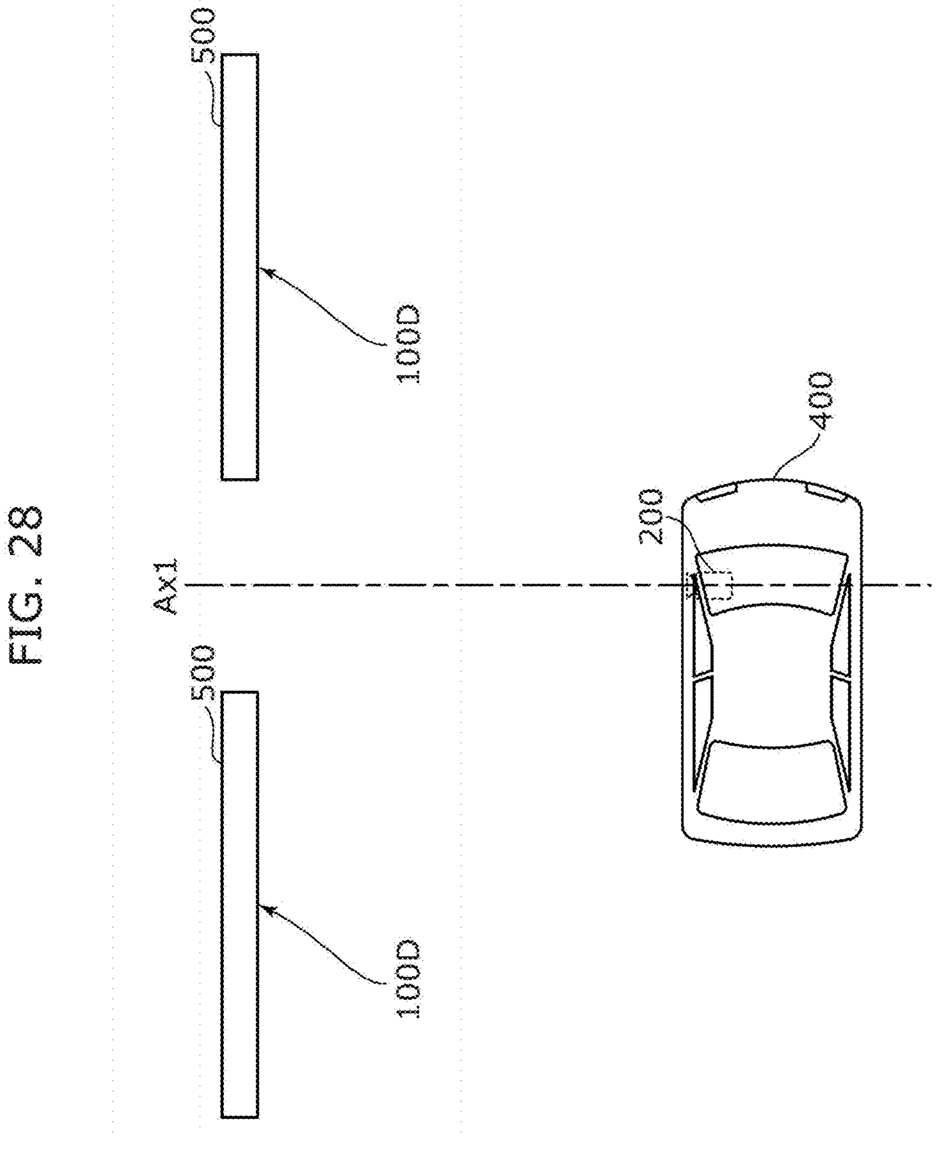
FIG. 28 illustrates another example of the configuration of the marker according to Variation 4 of Embodiment 2.

Moreover, marker 100D according to Variation 4 may be applied to camera 200 that captures an image of the left or the right of vehicle 400. As illustrated in FIG. 27 and FIG. 28, marker 100D may stand on a floor surface such that marker 100D is parallel to a front-back direction of vehicle 400.

(2-8. Variation 5)

Figure 29:
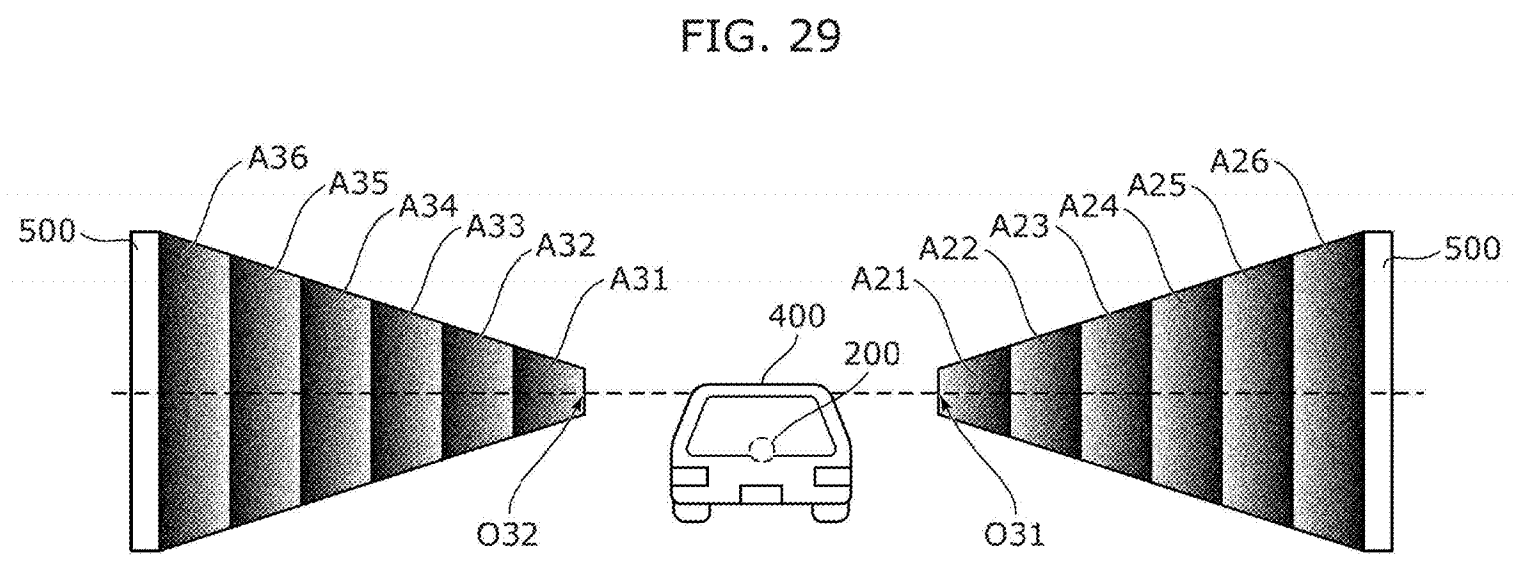
Figure 30:
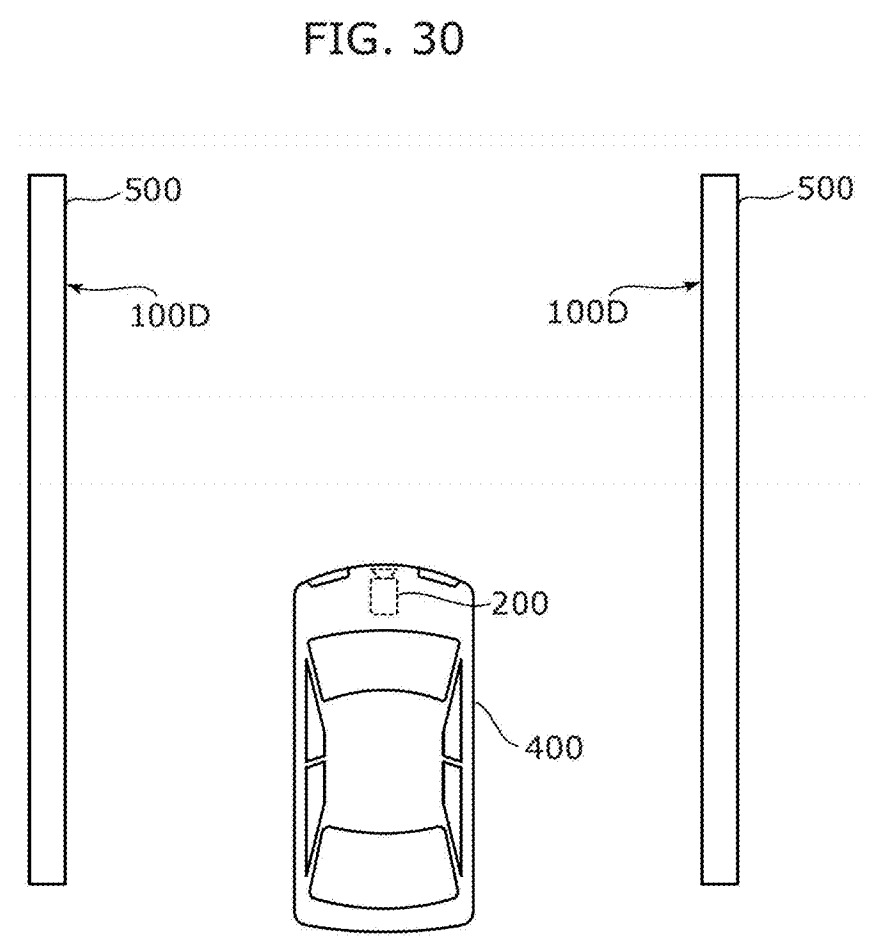

Although plate-like members 500 on which marker 100D according to Variation 4 of Embodiment 2 is provided stand on a floor surface such that plate-like members 500 are perpendicular to a front-back direction of vehicle 400, the present disclosure is not limited to this example. As illustrated in FIG. 29 and FIG. 30, plate-like members 500 may stand on a floor surface such that plate-like members 500 are parallel to a front-back direction of vehicle 400. In marker 100D according to Variation 5, the middle point of a side farther from vehicle 400, among two sides of one of plate-like members 500 extending in the vertical direction, may be determined as reference position O31, and the middle point of a side farther from vehicle 400, among two sides of the other of plate-like members 500 extending in the vertical direction, may be determined as reference position O32.

It should be noted that although camera 200 that captures an image of the front of vehicle 400 is illustrated as an example in FIG. 30, the present disclosure is not limited to this example and marker 100D according to Variation 4 may be applied to camera 200 that captures an image of the back of vehicle 400.

Figure 31:
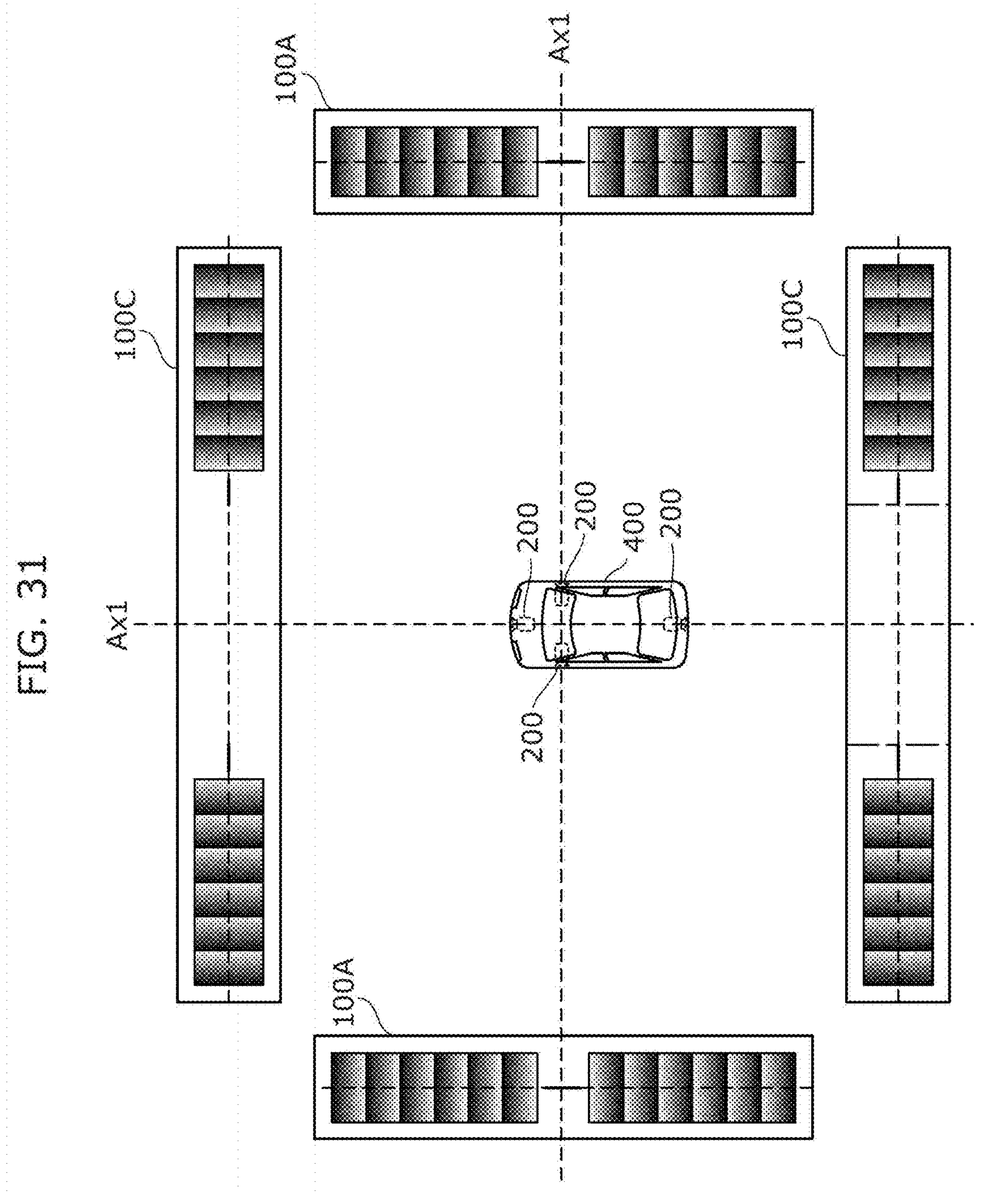
FIG. 31 illustrates another example of the configuration of the marker according to Variation 5 of Embodiment 2.

It should be noted that when cameras 200 that capture images of the front, the right, the left, and the back of vehicle 400 are provided to vehicle 400, two markers 100C may be provided on the front and back sides of vehicle 400 and two markers 100A may be provided on the right and left sides of vehicle 400, as illustrated in FIG. 31. It should be noted that two markers 100A may be provided on the front and back sides of vehicle 400 instead of two markers 100G.

It should be noted that a flat surface on which a marker is provided may be a road surface or a surface parallel to a road surface. Moreover, a plate-like member on which a marker is provided may be disposed or stand on a predetermined floor surface. Furthermore, a plate-like member on which a marker is provided may stand on a lateral side of a vehicle such that the plate-like member is parallel to a front-back direction of the vehicle.

(3. Others)

Although an amount of change in a color property is exemplified by an amount of change in brightness in the above-described embodiment, the present disclosure is not limited to this example and an amount of change in a color property may be an amount of change in hue, an amount of change in saturation, or an amount of change in a combination of at least two of brightness, hue, and saturation.

Although each area is configured so that the brightness decreases in a predetermined direction in Embodiment 1, each area may be configured so that the brightness increases in the predetermined direction. Also in Embodiment 2, the direction in which the brightness decreases is not limited to a direction away from a reference position and may be a direction approaching the reference position.

Although a common method is used for detecting boundaries between areas in a marker in Embodiment 1, the present disclosure is not limited to this example and a method for detecting boundaries on one side with respect to a position corresponding to the optical axis of camera 200 in an image may differ from that on the other side with respect to the position. In other words, as illustrated in FIG. 9, since a tendency of a first derivative value corresponding to positions in a predetermined direction is different between one side and the other side of the optical axis of a lens, a method for detecting boundaries may be changed according to the tendency. This can be applied to the case where a brightness pattern is common among a plurality of areas in marker 100 regardless of position of the optical axis, as in Embodiment 1. In other words, boundaries may be detected by performing a process of detecting a peak in a pattern in which the peak of a first derivative value is detected as illustrated in (b) in FIG. 9, and boundaries may be detected by further performing a process of calculating a centroid based on the peak in a pattern in which the peak of a first derivative value is detected as illustrated in (c) in FIG. 9.

In each of Embodiments 1 and 2, a marker may be directly painted on a floor surface, a wall surface, or a surface of a plate-like member.

In the above-described embodiments, each constituent element may be configured as dedicated hardware or may be realized by executing a software program suitable for each constituent element. Each constituent element may be realized by a program executing unit such as a CPU or processor loading and executing a software program stored in a recording medium such as a hard disk or semiconductor memory chip.

Moreover, each constituent element may be a circuit (or integrated circuit). These circuits may be configured as a single circuit or may be individual circuits. Moreover, these circuits may be ordinary circuits or dedicated circuits.

Furthermore, a general or specific aspect of the present disclosure may be realized as a system, a method, integrated circuitry, a computer program, or a non-transitory computer-readable recording medium such as a CD-ROM. Furthermore, a general or specific aspect of the present disclosure may be realized as any given combination of a system, a method, integrated circuitry, a computer program, and a non-transitory computer-readable recording medium.

For example, the present disclosure may be realized as an edge detection method performed by an edge detection device (computer or DSP), or as a program for causing a computer or DSP to perform the edge detection method.

Moreover, in the above-described embodiments, a process performed by a specific processing unit may be performed by another processing unit. Furthermore, the order of a plurality of processes in operation of the control system described in the above-described embodiments may be changed, or the plurality of processes may be performed in parallel.

Furthermore, forms obtained by various modifications to the embodiments that can be conceived by a person of skill in the art as well as forms realized by arbitrarily combining constituent elements and functions in the embodiments within the scope of the essence of the present disclosure are included in the present disclosure.

Further Information about Technical Background to this Application

The disclosures of the following patent applications including specification, drawings, and claims are incorporated herein by reference in their entirety: Japanese Patent Application No. 2023-055374 filed on Mar. 30, 2023 and Japanese Patent Application No. 2023-223571 filed on Dec. 28, 2023.

INDUSTRIAL APPLICABILITY

The present disclosure is applicable as a marker including boundaries between a plurality of areas that can be precisely identified, and an edge detection device and an edge detection method that can precisely determine boundaries between a plurality of areas included in a marker.

The invention claimed is:

1. A device that measures a size of an object using a marker, the device comprising:
- a processor; and
- a memory including a program that, when executed by the processor, causes the processor to:
  - identify the marker and the object in a captured image; and
  - measure the size of the object using the marker,
- wherein the marker includes N first areas that are arranged adjacent to one another in a predetermined direction, N being an integer greater than or equal to 3,
- at each of N−1 first boundaries between the N first areas, an amount of change in a color property corresponding to positions in the predetermined direction is greater than or equal to a first threshold value,
- in each of the N first areas, the amount of change in the color property corresponding to positions in the predetermined direction is less than or equal to a second threshold value that is less than the first threshold value, and
- a pattern of change in the color property corresponding to positions in the predetermined direction is common among the N first areas.

2. The device according to claim 1, wherein in each of the N first areas, the color property gradually increases or decreases from one end to an other end in the predetermined direction.

3. The device according to claim 1, wherein at each of the N−1 first boundaries, a position where the color property is highest in one of two first areas adjacent to each other across one of the N−1 first boundaries and a position where the color property is lowest in an other of the two first areas are adjacent to each other, the two first areas being included in the N first areas.

4. The device according to claim 1, wherein
the marker further includes:
M second areas that are arranged in the predetermined direction, M being an integer greater than or equal to 3; and
a reference line,
the reference line is disposed between the N first areas and the M second areas to intersect an optical axis of a camera,
the marker is disposed at a position to be captured by the camera,
the N first areas are arranged on one side in the predetermined direction with respect to a reference position where the reference line and the optical axis intersect,
the M second areas are arranged on an opposite side to the one side in the predetermined direction with respect to the reference position in the marker,
at each of M−1 second boundaries between the M second areas, the amount of change in the color property corresponding to positions in the predetermined direction is greater than or equal to the first threshold value,
in each of the M second areas, the amount of change in the color property corresponding to positions in the predetermined direction is less than or equal to the second threshold value, the pattern of change in the color property corresponding to positions in the predetermined direction is common among the M second areas, and
a first pattern of change in the color property in a direction away from the reference position in each of the N first areas and a second pattern of change in the color property in a direction away from the reference position in each of the M second areas are common to each other.

5. The device according to claim 4, wherein
the marker further includes a plurality of third areas defined by circles having different diameters centered on the reference position, and
each third area of the plurality of third areas includes one of the N first areas that corresponds to the third area and one of the M second areas that corresponds to the third area.

6. The marker device according to claim 4, wherein
the color property is brightness,
at each of the N−1 first boundaries, a position where the brightness is lowest in one of two first areas adjacent to each other across the first boundary and a position where the brightness is highest in an other of the two first areas are adjacent to each other in stated order in the direction away from the reference position, the two first areas being included in the N first areas, and
at each of the M−1 second boundaries, a position where the brightness is lowest in one of two second areas adjacent to each other across the second boundary and a position where the brightness is highest in an other of the two second areas are adjacent to each other in stated order in the direction away from the reference position, the two second areas being included in the M second areas.

7. The device according to claim 1, wherein the program further causes the processor to use the marker for camera calibration for a camera mounted on a vehicle.

8. The device according to claim 7, wherein
the marker further includes M second areas that are arranged in the predetermined direction, M being an integer greater than or equal to 3; and
a passage area through which the vehicle passes, the passage area being disposed between the N first areas and the M second areas.

9. The device according to claim 7, wherein
the camera captures the captured image of a front or a back of the vehicle, and
the predetermined direction extends in a left-right direction of the vehicle.

10. The device according to claim 9, wherein
the marker is disposed along a floor surface on which the vehicle is disposed.

11. The device according to claim 9, wherein
the marker stands on a floor surface on which the vehicle is disposed.

12. The device according to claim 7, wherein
the camera captures the captured image of a left or a right of the vehicle, and
the predetermined direction extends in a front-back direction of the vehicle.

13. The device according to claim 7, wherein
the camera captures the captured image of a front or a back of the vehicle,
the predetermined direction extends in a front-back direction of the vehicle, and
the marker stands on a floor surface on which the vehicle is disposed.

14. The device according to claim 1, wherein
the processor determines that an edge is present between two pixels adjacent to each other in the captured image when the amount of change in the color property between the two pixels is greater than or equal to the first threshold value, and
the processor determines that no edge is present between the two pixels when the amount of change in the color property between the two pixels is less than or equal to the second threshold value.

15. A detection method of measuring the size of the object using the device according to claim 1, the detection method comprising:
determining that an edge is present between two pixels adjacent to each other in the image when an amount of change in a color property between the two pixels is greater than or equal to the first threshold value; and
determining that no edge is present between the two pixels when the amount of change in the color property between the two pixels is less than or equal to the second threshold value.

* * * * *